United States Patent [19]
Buckley et al.

[11] Patent Number: 5,561,604
[45] Date of Patent: *Oct. 1, 1996

[54] COMPUTER CONTROLLED SYSTEM FOR VENDING PERSONALIZED PRODUCTS

[75] Inventors: Stephen P. Buckley, Kansas City, Mo.; Michael L. Vandemark, Shawnee, Kans.

[73] Assignee: Hallmark Cards, Incorporated, Kansas City, Mo.

[*] Notice: The term of this patent shall not extend beyond the expiration date of Pat. No. 5,036,472.

[21] Appl. No.: 602,439

[22] Filed: Oct. 22, 1990

Related U.S. Application Data

[63] Continuation-in-part of Ser. No. 282,013, Dec. 8, 1988, Pat. No. 5,036,472, and Ser. No. 514,670, Apr. 25, 1990.

[51] Int. Cl.⁶ ..................................................... G06F 17/00
[52] U.S. Cl. .............................. 364/479.05; 364/478.01; 364/468.24; 364/479.05
[58] Field of Search .................................. 364/479, 478, 364/468, 400–412; 235/379, 381, 383, 385, 375; 395/144–148, 155–161

[56] References Cited

U.S. PATENT DOCUMENTS

| | | |
|---|---|---|
| Re. 32,115 | 4/1986 | Lockwood et al. . |
| 3,454,956 | 7/1969 | Icenbice, Jr. et al. . |
| 3,609,250 | 9/1971 | Morris . |
| 3,688,276 | 8/1972 | Quinn . |
| 3,705,384 | 12/1972 | Wahlberg . |
| 3,800,932 | 4/1974 | Dana . |
| 3,828,904 | 8/1974 | Naitou et al. . |
| 3,864,708 | 2/1975 | Allen . |
| 3,892,427 | 7/1975 | Kraynak et al. . |
| 3,898,930 | 8/1975 | Ikegami et al. . |
| 3,932,036 | 1/1976 | Ueda et al. . |
| 3,943,335 | 3/1976 | Kinker et al. . |

(List continued on next page.)

FOREIGN PATENT DOCUMENTS

| | | |
|---|---|---|
| 1278862 | 1/1991 | Canada . |
| 79302164 | 4/1980 | European Pat. Off. . |
| 83108181 | 3/1984 | European Pat. Off. . |
| 0103759A2 | 3/1984 | European Pat. Off. . |
| 89810037 | 8/1989 | European Pat. Off. . |
| 90313917 | 4/1991 | European Pat. Off. . |

(List continued on next page.)

OTHER PUBLICATIONS

"High Tech Bard of Greeting Cards", Nations Business, Feb. 1985, 1 page.
Card Shop Brochure, Artsci, 1986, 1 page.
The Social Secretary Brochure, 5 pages (date unknown).
"The Card/O/Mat." Brochure, 6 pages, (date unknown).

(List continued on next page.)

*Primary Examiner*—James P. Trammell
*Attorney, Agent, or Firm*—Leydig, Voit & Mayer, Ltd.

[57] ABSTRACT

A machine for delivering a product which may be automatically personalized by a customer at the time of purchase is disclosed. The product may be selected from a plurality of different types of products which may communicate in a plurality of media such as print, braille, or audio or video tape. The machine stores base products which may be modified to communicate in a plurality of media. Product handling means effects a series of operations including transfer of a base product from storage. Electrically controllable modification means effects modification of the base product to produce a modified base product and electrically controllable delivery means effects delivery of the modified base product. An enclosure contains the storage and product handling means therewithin. The apparatus further comprises payment means operable by a customer on the outside of the enclosure to effect payment for a product and selection means operable by a customer on the outside of the enclosure to effect entry of control data which defines the customer's selection of the media form of the base product and modifications to be performed of the selected media form to define the desired final form of the personalized product to be delivered to the customer.

45 Claims, 15 Drawing Sheets

U.S. PATENT DOCUMENTS

| | | |
|---|---|---|
| 3,949,375 | 4/1976 | Ciarlo . |
| 3,982,744 | 9/1976 | Kraynak et al. . |
| 3,990,710 | 11/1976 | Hughes . |
| 4,007,362 | 2/1977 | Sindermann . |
| 4,023,013 | 5/1977 | Kinker . |
| 4,034,839 | 7/1977 | Lee . |
| 4,041,467 | 8/1977 | Cota et al. . |
| 4,058,056 | 11/1977 | Rubin . |
| 4,070,698 | 1/1978 | Curtis et al. . |
| 4,085,445 | 4/1978 | Blevins et al. . |
| 4,096,933 | 6/1978 | Massa . |
| 4,144,656 | 3/1979 | Podkopaev et al. . |
| 4,173,024 | 10/1979 | Miller . |
| 4,190,819 | 2/1980 | Burgyan . |
| 4,247,759 | 1/1981 | Yuris et al. . |
| 4,260,229 | 4/1981 | Bloomstein . |
| 4,275,449 | 6/1981 | Aish . |
| 4,300,040 | 11/1981 | Gould et al. . |
| 4,305,131 | 12/1981 | Best . |
| 4,308,017 | 12/1981 | Laughon et al. . |
| 4,319,336 | 3/1982 | Anderson et al. . |
| 4,339,134 | 7/1982 | Macheel . |
| 4,354,613 | 10/1982 | Desai et al. . |
| 4,359,631 | 11/1982 | Lockwood et al. . |
| 4,369,082 | 1/1983 | Kerwin . |
| 4,396,307 | 8/1983 | Shah et al. . |
| 4,412,292 | 10/1983 | Sedam et al. . |
| 4,414,467 | 11/1983 | Gould et al. . |
| 4,414,896 | 11/1983 | Fischer . |
| 4,417,322 | 11/1983 | Berry et al. . |
| 4,417,722 | 11/1983 | Ishii et al. . |
| 4,418,390 | 11/1983 | Smith et al. . |
| 4,431,323 | 2/1984 | Kulow . |
| 4,434,467 | 2/1984 | Scott . |
| 4,435,772 | 3/1984 | Suzuki et al. . |
| 4,436,776 | 3/1984 | Wojcik . |
| 4,449,186 | 5/1984 | Kelly et al. . |
| 4,458,802 | 7/1984 | Maciver et al. . |
| 4,459,676 | 7/1984 | Oguchi . |
| 4,460,957 | 7/1984 | Eggebrecht et al. . |
| 4,463,874 | 8/1984 | Friedman et al. . |
| 4,481,590 | 11/1984 | Otten . |
| 4,484,304 | 11/1984 | Anderson et al. . |
| 4,488,244 | 12/1984 | Freeman . |
| 4,489,389 | 12/1984 | Beckwith et al. . |
| 4,498,139 | 2/1985 | Malinovsky . |
| 4,517,578 | 5/1985 | Tazaki . |
| 4,519,037 | 5/1985 | Brodeur et al. . |
| 4,528,643 | 7/1985 | Freeny, Jr. . |
| 4,546,434 | 10/1985 | Gioello . |
| 4,559,598 | 12/1985 | Goldwasser et al. . |
| 4,567,359 | 1/1986 | Lockwood . |
| 4,575,813 | 3/1986 | Bartlett et al. . |
| 4,577,206 | 3/1986 | Hibino . |
| 4,596,924 | 6/1986 | Watanabe . |
| 4,598,376 | 7/1986 | Burton et al. . |
| 4,599,598 | 7/1986 | Komoda et al. . |
| 4,608,662 | 8/1986 | Watanabe et al. . |
| 4,610,200 | 9/1986 | Metso . |
| 4,621,443 | 11/1986 | Weinreich . |
| 4,623,292 | 11/1986 | Suzuki et al. . |
| 4,625,275 | 11/1986 | Smith . |
| 4,627,015 | 12/1986 | Stephens . |
| 4,640,529 | 2/1987 | Katz . |
| 4,646,250 | 2/1987 | Childress . |
| 4,650,977 | 3/1987 | Couch . |
| 4,652,998 | 3/1987 | Koza et al. . |
| 4,654,799 | 3/1987 | Ogaki et al. . |
| 4,655,026 | 4/1987 | Wigoda . |
| 4,664,546 | 5/1987 | Runzi . |
| 4,672,554 | 6/1987 | Ogaki . |
| 4,674,041 | 6/1987 | Lemon et al. . |
| 4,674,055 | 6/1987 | Ogaki et al. . |
| 4,677,565 | 6/1987 | Ogaki et al. . |
| 4,683,536 | 7/1987 | Yamamoto . |
| 4,699,532 | 10/1987 | Smith . |
| 4,700,317 | 10/1987 | Watanabe et al. . |
| 4,700,318 | 10/1987 | Ockman . |
| 4,703,465 | 10/1987 | Parker . |
| 4,710,885 | 12/1987 | Litteken . |
| 4,711,543 | 12/1987 | Blair et al. . |
| 4,712,174 | 12/1987 | Minkler, II . |
| 4,719,885 | 1/1988 | Nagano et al. . |
| 4,723,212 | 2/1988 | Mindrum et al. . |
| 4,724,468 | 2/1988 | Bulls . |
| 4,726,697 | 2/1988 | Maedge et al. . |
| 4,727,589 | 2/1988 | Hirose et al. . |
| 4,733,362 | 3/1988 | Haraguchi . |
| 4,736,306 | 4/1988 | Christensen et al. . |
| 4,740,904 | 4/1988 | Nagle . |
| 4,750,131 | 6/1988 | Martinez . |
| 4,750,151 | 6/1988 | Baus . |
| 4,760,245 | 7/1988 | Fukaya . |
| 4,767,917 | 8/1988 | Ushikubo . |
| 4,775,935 | 10/1988 | Yourick . |
| 4,787,050 | 11/1988 | Suzuki . |
| 4,789,147 | 12/1988 | Berger et al. . |
| 4,789,907 | 12/1988 | Fischetti et al. . |
| 4,801,375 | 1/1989 | Padilla . |
| 4,814,592 | 3/1989 | Bradt et al. . |
| 4,817,005 | 2/1989 | Kubota et al. . |
| 4,817,043 | 3/1989 | Brown . |
| 4,818,854 | 4/1989 | Davies et al. . |
| 4,833,307 | 5/1989 | Gonzalez-Justiz . |
| 4,839,505 | 6/1989 | Bradt et al. . |
| 4,845,635 | 7/1989 | Rosselli . |
| 4,847,473 | 7/1989 | Lee et al. . |
| 4,847,764 | 7/1989 | Halvorson . |
| 4,866,661 | 9/1989 | De Prins . |
| 4,873,643 | 10/1989 | Powell et al. . |
| 4,882,675 | 11/1989 | Nichtberger et al. . |
| 4,884,212 | 11/1989 | Stutsman . |
| 4,891,660 | 1/1990 | Biondo, Jr. . |
| 4,896,791 | 1/1990 | Smith . |
| 4,903,815 | 2/1990 | Hirschfeld et al. . |
| 4,918,604 | 4/1990 | Baum . |
| 4,949,257 | 8/1990 | Orbach . |
| 4,951,203 | 8/1990 | Halamka . |
| 4,970,655 | 11/1990 | Winn et al. . |
| 4,982,337 | 1/1991 | Burr et al. . |
| 4,982,343 | 1/1991 | Hourvitz et al. . |
| 4,982,346 | 1/1991 | Girouard et al. . |
| 4,982,349 | 1/1991 | Cahall, Jr. et al. . |
| 4,991,108 | 2/1991 | Hamilton . |
| 4,992,940 | 2/1991 | Dworkin . |
| 4,993,587 | 2/1991 | Abe . |
| 4,999,065 | 3/1991 | Wilfert . |
| 5,016,183 | 5/1991 | Shyong . |
| 5,017,953 | 5/1991 | Biondo, Jr. . |
| 5,018,085 | 5/1991 | Smith, Jr. . |
| 5,020,958 | 6/1991 | Tuttobene . |
| 5,025,397 | 6/1991 | Suzuki . |
| 5,025,399 | 6/1991 | Wendt et al. . |
| 5,029,099 | 7/1991 | Goodman . |
| 5,036,472 | 7/1991 | Buckley et al. . |
| 5,038,293 | 8/1991 | Goodman . |
| 5,040,132 | 8/1991 | Schuricht et al. . |
| 5,053,956 | 10/1991 | Donald et al. . |
| 5,056,029 | 10/1991 | Cannon . |
| 5,061,098 | 10/1991 | Engelhardt et al. . |

FOREIGN PATENT DOCUMENTS

| | | |
|---|---|---|
| 0453688A1 | 10/1991 | European Pat. Off. . |
| 91309669 | 10/1991 | European Pat. Off. . |
| 2621153 | 9/1987 | France . |
| 8713494 | 3/1989 | France . |
| 8909224 | 1/1991 | France . |
| 59-33573A | 2/1984 | Japan . |
| 2-27372 | 8/1988 | Japan . |
| 1005827 | 9/1965 | United Kingdom . |

| | | |
|---|---|---|
| 2050106 | 12/1980 | United Kingdom . |
| 2065412 | 6/1981 | United Kingdom . |
| 2105075 | 3/1983 | United Kingdom . |
| 2119600 | 11/1983 | United Kingdom . |
| 2150728 | 7/1985 | United Kingdom . |
| 2177245 | 10/1988 | United Kingdom . |
| 2208460 | 3/1989 | United Kingdom . |
| 2222341 | 2/1990 | United Kingdom . |
| 228125 | 8/1990 | United Kingdom . |
| 2240897 | 8/1991 | United Kingdom . |
| WO82/00123 | 1/1982 | WIPO . |
| WO83/00461 | 2/1983 | WIPO . |
| WO83/00628 | 3/1983 | WIPO . |
| WO86/04703 | 8/1986 | WIPO . |
| WO90/07166 | 6/1990 | WIPO . |
| WO91/06913 | 5/1991 | WIPO . |
| WO92/02909 | 2/1992 | WIPO . |

OTHER PUBLICATIONS

"7–Eleven to Sell Do–it–yourself Tickets"; Insight, Jan. 16, 1989, p. 42.

"In–store computer designs home projects" Design News, Oct. 23, 1989, p. 38.

"Now There's a Robot", Design News, Mar. 26, 1990, pp. 78–81.

Tyler, Michael, "Touchscreens: Big Deal or No Deal," *Datamation*, vol. 30, No. 1 (Jan. 1984) pp. 146–154.

Albert, Alan E., "The effect of Graphic Input Devices on Performance in a Cursor Position Task," *Proceedings of the 26th Annual Meeting of the Human Factors Society* (1982) pp. 54–57.

English, William K., Englehart, Douglas C., and Berman, Melvyn L., "Display—Selection Techniques for Text Manipulation," *IEEE Transactions on Human Factors in Electronics*, HFE–8 1 (Mar. 1967), pp. 5–15.

Shneiderman, Ben, *Designing the User Interface,* Reading MA: Addison–Wesley Publishing Co., Inc. (1987), pp. 271–282.

Hohman, Edward J., "How Computerized Cards Make This Shop 'Truly A Treat'", *Greetings Magazine*, vol. 55, No. 3, Jan. 1987, pp. 12, 13, and 24.

Date, C. J., *An Introduction to Database Systems*, vol. I, Third Edition, Reading, MA: Addison–Wesley Publishing Col., Inc. (1981) pp. 120–121.

David Balsam and Martin Kahn, *The Print Shop Reference Manual,* Copyright 1986, 1989 Broderbund Software, Inc. pp. 1–51.

McAndress, Steve, "Magical Poet Literature", pp. 1–20 date unknown.

"Roboclerk In Tune With Service Industry," Chuck Murray, Chicago Tribune, dated May 28, 1990, starting at p. 1.

Documents published by Hallmark Cards, Inc. date unknown.

"A 'Full House' Is Dealt to the Card Party," G. Venette (PPR), Apr. 1986, pp. 42–43.

"The Computer Poet," Sales Brochure, © Oct. 1984 The Computer Poet Corporation.

"Let's Make Calendars & Stationery™," Melody Hall™, Printware Series™, © 1986 Kyocera Unison, Inc.

Printmaster printout, date unknown (From Patent Office Examiner's Personal File).

"Got Something To Announce, Promote, Sell?," 1987, G. Solomon (Family Computing, Jun. 1987, starting at p. 43).

"Create Your Own Greeting Cards," 1983, M. Adler (microcomputer software, Jan. 1, 1985, p. 655).

"Cards Offer High–Tech Greetings," 1983, T. Shea (Info-World, Apr. 18, 1983, starting at p. 1).

Article by Kerlow entitled "The Computer As An Artistic Tool," Sep. 1984, BYTE Magazine, starting at p. 189.

Article by Cooper entitled "Computer Landscapes," Sep. 1984, BYTE Magazine, starting at p. 211.

Article by Heiser entitled "A Weaving Simulator," Sep. 1982, BYTE Magazine, starting at p. 512.

"Underware"™, 1986 catalog listing "Print Custom Designs On T–Shirts . . . In Color With Your Computer And Printer !!!".

Compucards item in "What's New?" at page 574 of the Dec. 1983 issue of BYTE Magazine.

"Comp–U–Store Could Change Retail Economics," Jul. 1983, Direct Marketing Magazine, starting at p. 101.

"Setting Up Shop On Computer Screens," Mar. 1984, Nation's Business Magazine, starting at p. 57.

"Touchcom™ Interactive Videodisc Catalog Markets Furniture at Dayton's," Sep.–Oct. 1985, Videodisc and Optical Disk, starting at p. 343.

"Retailers Beginning to Tune in Video Displays," Nov. 18, 1985, Advertising Age vol. 56, No. 90, starting at p. 66.

"These Instant–Win Games Talk Back," Adweek's Promote, starting at p. 4. date unknown.

"Cardmarketing . . . Your Way To A Powerful Database," Paul W. Corliss, Jr., Excerpt of Presentation to the Direct Marketing Assoc. 71st Annual Conference. date unknown.

"The Sports Vacation Network" Sales Brochure, The Sports Vacation Network™, Research and Development by Intermark®. date unknown.

"Vision 1000: The Total Promotion Delivery Vehicle," Sales Brochure, Advanced Promotion Technologies. date unknown.

"Which Way to Go With Interactive Video?," Sales Brochure, © 1987 Interac Corporation.

"Interactive Video Merchandising," Sales Brochure, ByVideo Inc. dated May 1988.

"The Right Medium The Right Moment," Sales Brochure, Advanced Interactive Video. date unknown.

"Exhibit Source, Inc. Company Background," Sales Brochure, Exhibit Source, Inc. date unknown.

"Food Chain Employs Scanning Technology In Instant Win/ Prize Drawing Promotion," Incentives In Action, Premium/ Incentive Business Magazine, starting at p. 22. date unknown.

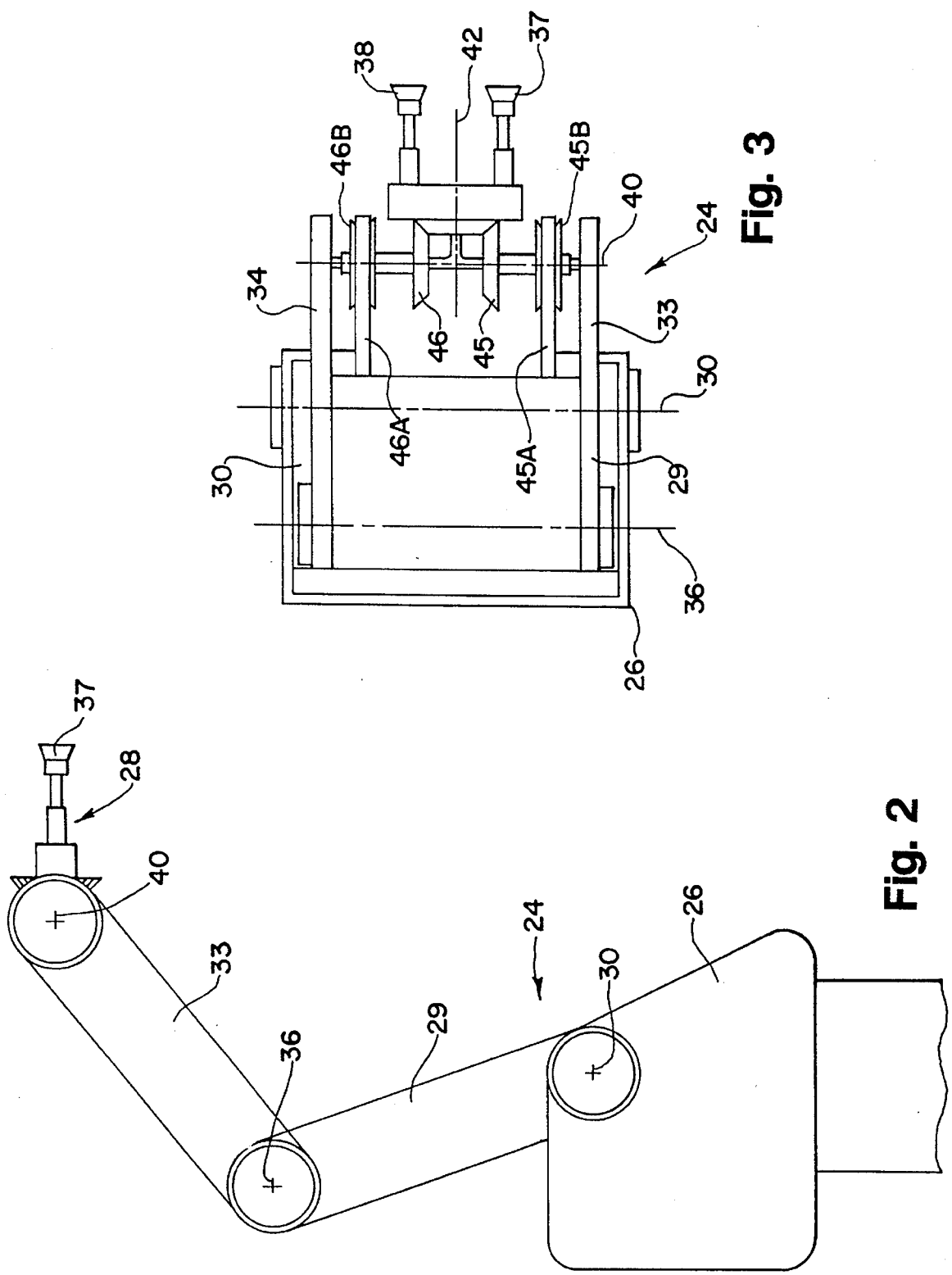

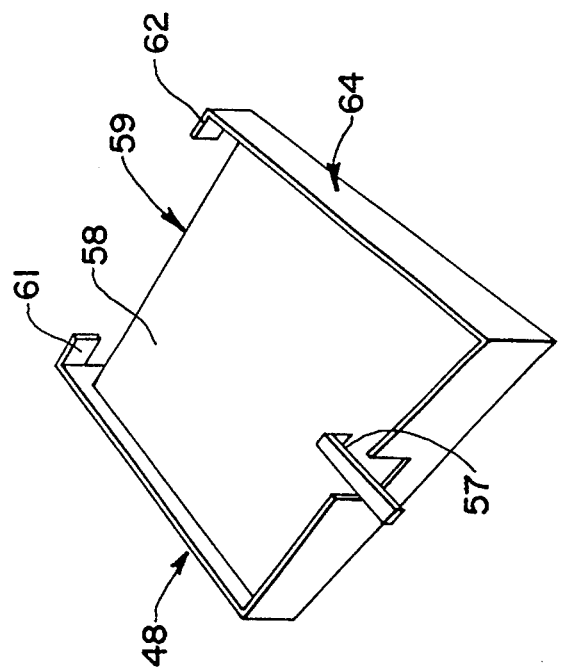
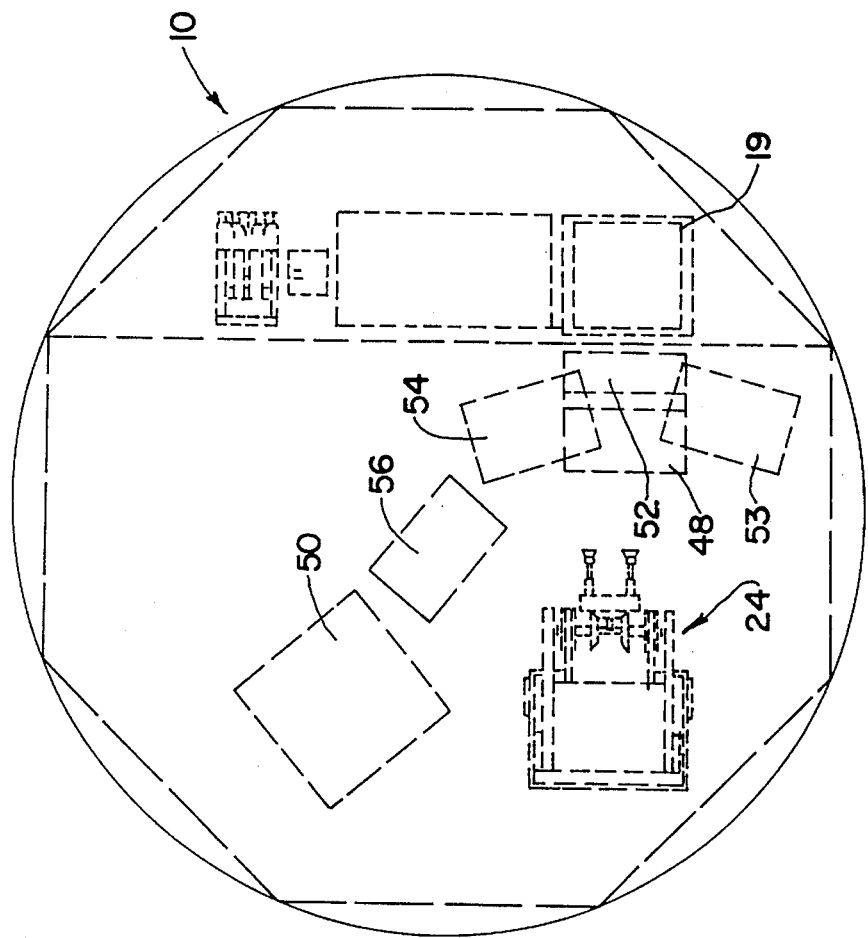

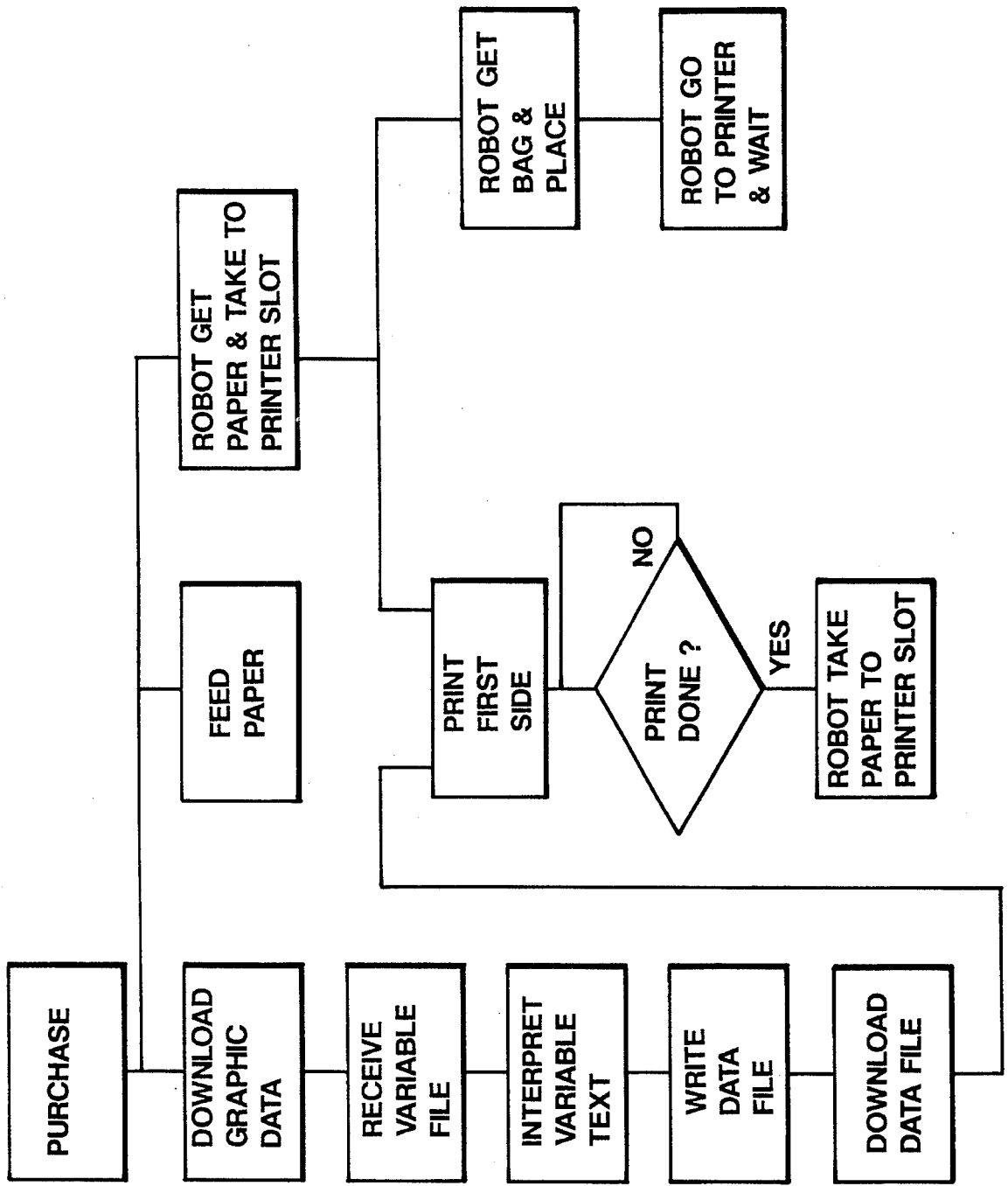

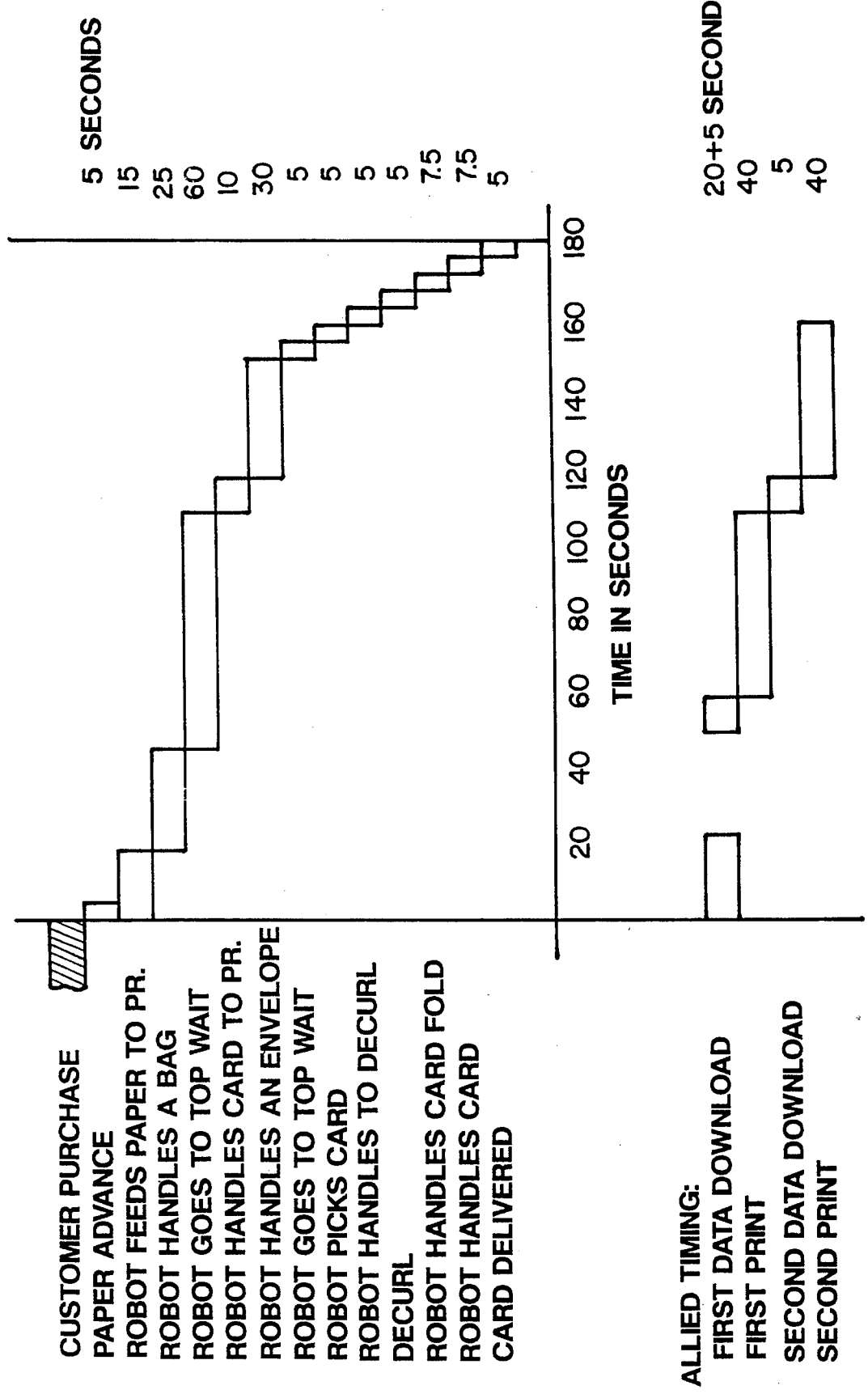

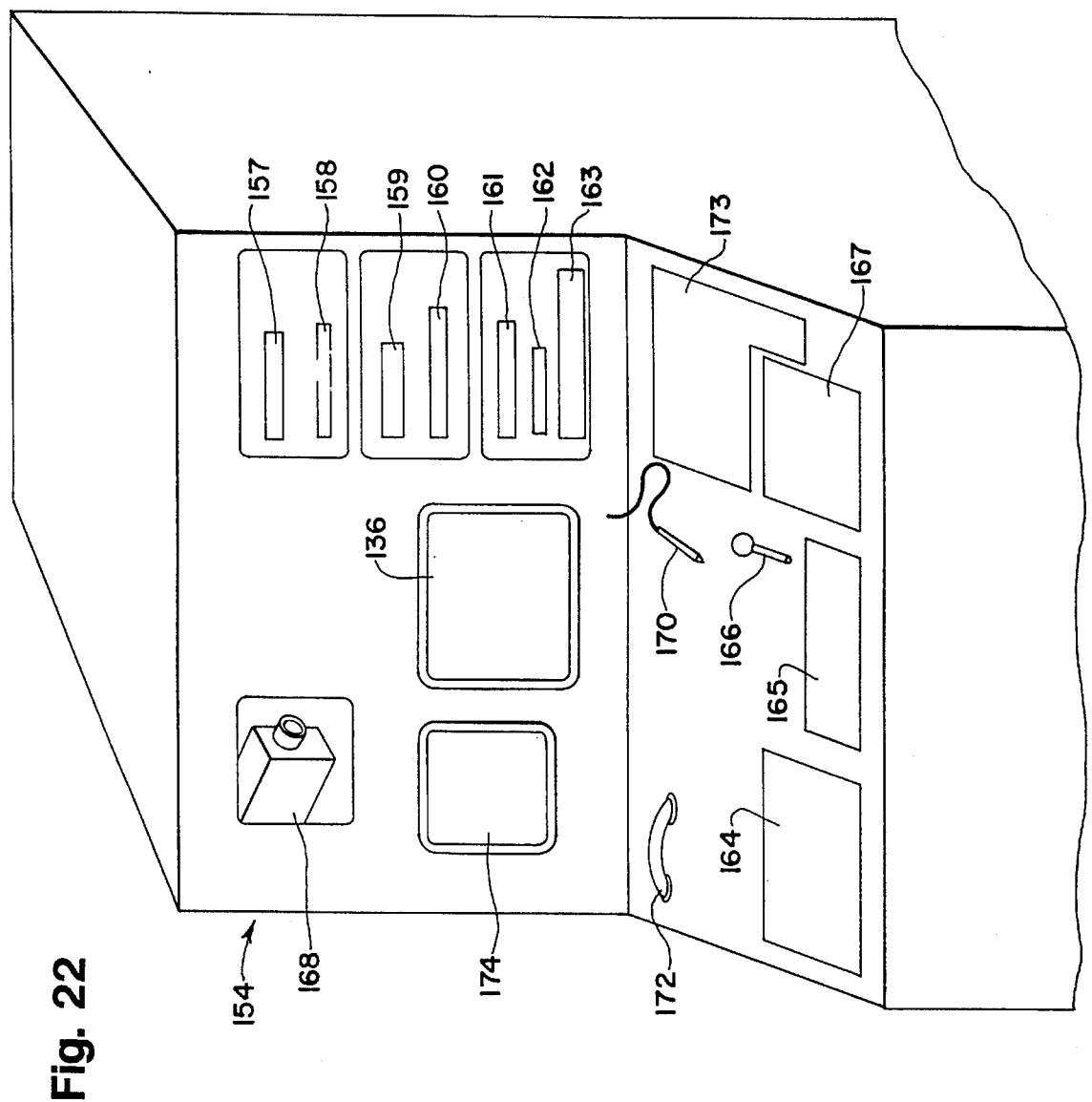

COMPUTER CONTROLLED SYSTEM FOR VENDING PERSONALIZED PRODUCTS

REFERENCE TO RELATED APPLICATIONS

This application is a continuation-in-part of application Ser. No. 07/282,013, filed Dec. 8, 1988, now U.S. Pat. No. 5,036,472, and a continuation-in-part of application Ser. No. 07/514,670, filed Apr. 25, 1990. The disclosures of said applications are incorporated by reference.

BACKGROUND OF THE INVENTION

1. Field of the Invention

This invention relates to a vending machine and more particularly to an interactive machine which is usable to dispense a variety of personalized products including greeting cards and/or visual and audio media as selected by a customer. It is arranged to accept inexpensive stock products and to effect modifications such as to provide highly attractive personalized products. It is also programmable according to type and attributes of products to be dispensed and of modifications to be effected for personalization thereof, to facilitate communication of readily understandable information as to available products and their attributes and of the steps required for selection thereof so as to be readily operable by a customer without assistance. At the same time, it is reliable, efficient and fast in operation and it is manufacturable at relatively low cost.

2. Background of the Prior Art

As discussed in the introductory portion of the specification of the aforementioned related applications, U.S. Pat. Nos. 3,892,427 and 3,982,744 disclose methods for the production of personalized "ME" books in which, for example, the name of a child who is to receive a story book is printed in the text of a story book. In the production of such books, a computer was used to control a printer to print variable data on preprinted sheet material to form sheets which were bound together in a separate operation to provide the final hard cover book product. As disclosed, many types of variable data could be stored in the computer and such variable data may include quality control indicia which may include check bars or other graphics.

The Rosewarne et al. U.S. Pat. No. 4,616,327 discloses methods similar to those disclosed in the "ME" book patents and the printing of specific types of graphics including pictorial figures having physical characteristics similar to personalized data introduced into the system. A standard microprocessor is programmed to provide storage and combining functions after personalized data is introduced into the system by temporary storage by the purchaser or user on a storage medium such as a punched card. One or more plotters are used for producing the final product, an eight pen plotter being disclosed.

Many vending machines have heretofore been provided for vending of cans, bottles, hot and cold liquids in cups, sandwiches, candy, combs, and various other products, each machine being typically designed to handle only products which have a physical size and shape within a certain limited range. For example, one of such machines is disclosed in the Ogaki et al. U.S. Pat. No. 4,677,565 and is designed for vending of a computer program selected by a customer from menus displayed on a screen, the selected program being recorded on a tape cassette or floppy disc inserted into a tape or disc drive of the machine.

SUMMARY OF THE INVENTION

This invention was evolved with the general object of providing a machine which incorporates advantageous features of the machines disclosed in the aforesaid related application and which is arranged to accept inexpensive stock products and to effect modifications which are such as insure delivery of very attractive and high quality personalized products.

Another object of the invention is to provide a machine which is usable to dispense a wide variety of personalized products including greeting cards and/or visual and audio media as created by a customer.

A further object of the invention is to provide a machine which is programmable according to type and attributes of products to be dispensed and of modifications to be effected for personalization thereof and which is operable to facilitate communication to of readily understandable information as to available products and their attributes and of the steps required for selection thereof so as to be readily operable by a customer without assistance.

Still another object of the invention is to provide a machine which is very versatile and which is reliable, efficient and fast in operation while being manufacturable at relatively low cost.

In accordance with the invention a machine is provided which incorporates features of the aforesaid Buckley et al. application particularly with regard to providing a flexible manufacturing platform which allows for selection from among a number of types of products to be delivered, from among a number of types of data to be entered by a customer for personalization of a product, i.e. for creation of a product in accordance with preferences of a customer with respect to the form of a base product and changes, additions or other modifications to be performed on the base product to produce the desired final product. These features cooperate to provide a versatile "just-in-time" manufacturing platform by which each customer can select from among a wide variety of available products and types of modifications and obtain a personalized product tailored to his or her preference at the time of purchase, but in a highly efficient manner with materials being used only as required to substantially eliminate waste.

A machine constructed in accordance with the invention preferably includes an enclosure with selection and payment means on the outside thereof and with storage and handling means on the inside thereof, all coupled to a computer equipment which is on the inside of the enclosure and which is programmed to facilitate a customer's creation from among types of products to be delivered and the desired mode of personalization thereof and to deliver a completed personalized product to a receptacle from which it may be removed by the customer.

An important feature of the invention relates to the provision for manufacture of personalized greeting cards from "white paper" i.e. paper stock of any color and of any weight and in sheet or roll form, particularly including, for example, heavy paper stock or cardboard such as 59 pound stock used for high quality greeting cards. To provide a completed card, the machine imprints on such stock both graphics and text as selected by a customer to provide a personalized card of very high quality. With this arrangement, all stock is used. There are no expensive preprinted forms which might go unused and waste is eliminated. Another very important advantage is that a great many graphics and text formats may be permanently stored in digital form as on hard discs, tape or CD ROMs, to provide customers with much wider selections of graphics and text formats.

Specific features of the invention relate to the provision for selection by a customer from among a number of different types of modifications of a product. In addition to imprinting of personalized graphics and text, a machine of the invention may include cutting apparatus such as laser apparatus, operative to cut paper or other stock to desired shapes under customer control and may include apparatus for applying foil or other decorations or add-on decorative pieces such as a holographic icon.

A machine of the invention preferably retains a number of advantageous features as disclosed in the aforesaid prior applications. For example, available products and their desirable attributes and features are identified both audibly and visually through presentation of a sequence of images and associated sound to present a series of descriptions of available products and their features with instructions as to initiating use of the machine. When a customer initiates use of the machine, he or she is then supplied with specific instructions to make it possible to make selections easily, quickly and accurately.

Preferably, images are presented on a CRT screen which is also usable as a touch screen for selection of the desired product and the desired features and attributes thereof. The touch screen or a keyboard or other input device may be used, for example, to select from among a number of different birthday cards and to enter the name and birthdate of the intended receiver, the name of the sender and other personalized data.

After a customer selects and pays for a greeting card or other product, a data entering mode may be initiated in which he or she is asked to enter data or otherwise select the form of the final product, as by entering the names of the receiver and sender of a birthday card, for example. The data entering mode may further include operations for viewing and correction of entered data.

Further important features of the invention relate to the handling of a product, wherein a product is selected, transferred to modifying apparatus such as a printer and subsequently transferred therefrom to a delivery receptacle. An illustrated machine includes a robot which is so positioned relative to stored products and the printer or other modifying apparatus as to facilitate selection of a product and transfers to and from the modifying apparatus. Preferably the robot includes a turret head which is rotatable about a fixed axis with a transfer head supported from the turret head through an articulated arm assembly and with the stored products and modifying apparatus positioned in angularly spaced relation. As is disclosed in the aforementioned Buckley et al. application, the transfer head preferably includes suction cups for effecting transfers of paper or other products from one or more supply sections to a printer or other modification means and thereafter to a delivery point.

Still further features relate to the control of operations such as to facilitate rapid and efficient delivery of products. For example, data transfers take place while transfers of a sheet are being effected and, while printing or other modifications are taking place, other required operations may take place, such as the delivery of an envelope and a bag to a delivery section. The result is that the time required to produce the final product is minimized.

Specific features of the invention relate to the production of cards on plain greeting card stock with color graphics and text to produce cards which are of high quality and very attractive and which are selected by customers from wide variety of possible designs and formats and which are imprinted with text selected by customers for personalization thereof. These features relate to the adaptation of a color printer for reliable printing on greeting card stock, to the handling of greeting card stock and to the selection of graphics and text by customers.

In an illustrated embodiment, a high quality color ink jet printer is used advantageously which is of a known type and which is designed for printing a sheet of standard weight and width while being held to form a partial cylinder about the axis of a rotary ink jet head. Provisions are made to adapt such a printer for printing on a sheet of heavy greeting card stock of narrower width, and for removing curl of a sheet after printing.

It will be understood that the invention is not limited to the use a color printer having a rotary ink jet head, to a printer which prints on only one side of paper or to a printer which prints on sheets, but may be used in conjunction with any color or black and white printing technology and may be applied to printers which simultaneously print on both sides of paper and printers in which paper is supplied in roll rather than sheet form.

Still additional features of the invention relate to the extension of principles used in producing greeting cards to the production of various other types of products and to the accommodation of many different types of input for personalization of the products.

These and other features provide a system which is highly flexible and versatile, capable of meeting the desires of customers and reliably providing final products of uniform high quality and at reasonable cost.

This invention contemplates other objects, features and advantages which will become more fully apparent from the following detailed description taken in conjunction with the accompanying drawings.

BRIEF DESCRIPTION OF THE DRAWINGS

FIG. 2 is a side elevational view of a robot used in handling of products within the machine of FIG. 1;

FIG. 3 is a top plan view of the robot of FIG. 2;

FIG. 5 is a top plan view corresponding to FIG. 4;

FIG. 6 is a perspective view illustrating a blank card supply and feeder section of the machine of FIG. 1;

FIGS. 18, 19 and 20 are flow diagrams illustrating operations of a background computer of the machine;

FIG. 21 is a timing diagram relating to operations of machine;

FIG. 22 is a front view of a more versatile machine constructed in accordance with the invention.

DESCRIPTION OF PREFERRED EMBODIMENTS

Figure 1:
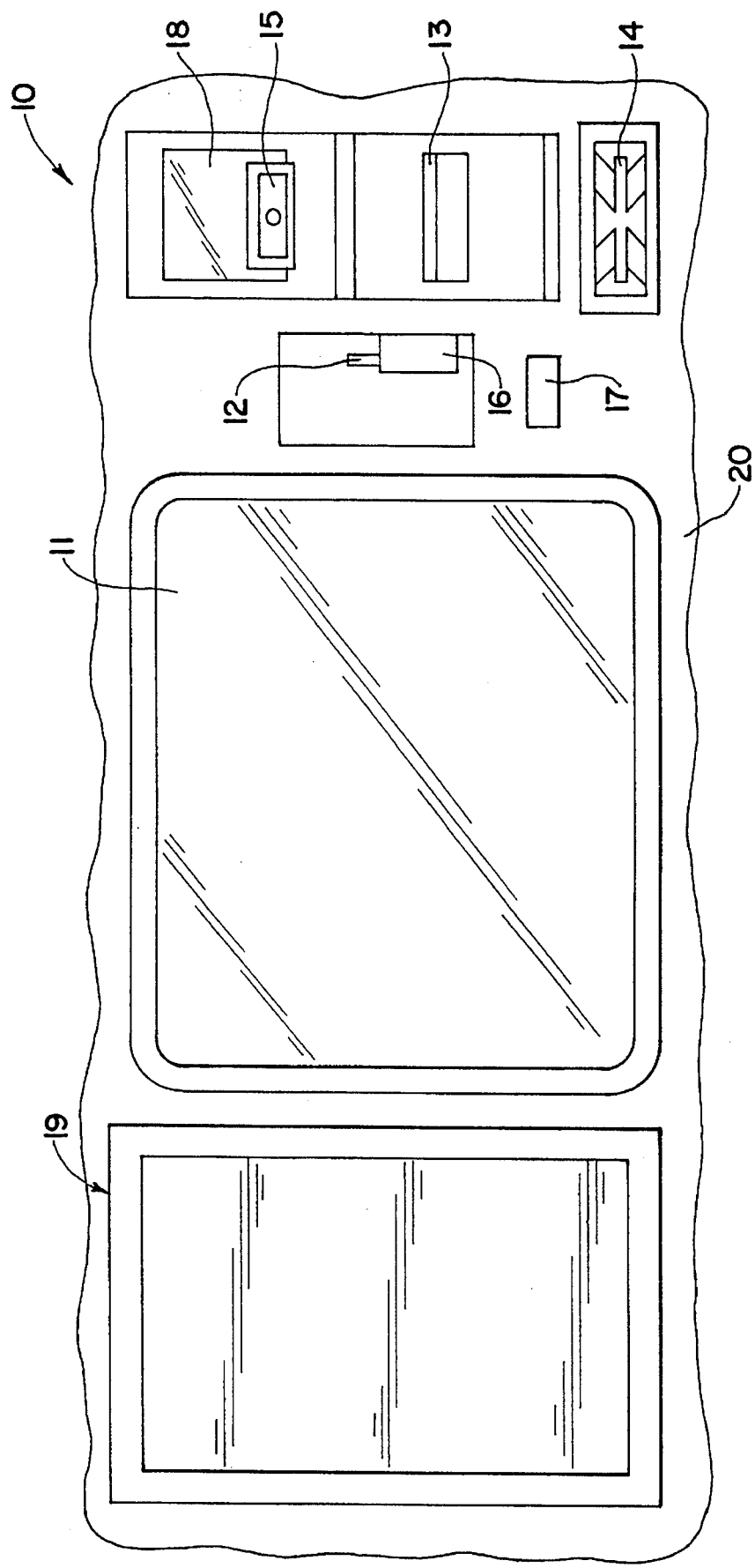
FIG. 1 shows a front panel portion of a vending machine constructed in accordance with the invention.

Reference numeral 10 generally designates a vending machine which is constructed in accordance with the principles of this invention and which is particularly designed for vending personalized greeting card but which may be used for vending of other personalized products as hereinafter described in more detail.

The machine 10 includes presentation means including a screen 11 which in accordance with the invention is operable to present visual illustrations in color to enable a customer to select from among a large number of available greeting cards or other products and to enable the customer to select text and other modifications as may be desired for personalization of the selected card or product. The presentation means also includes voice generating means for provide an audible presentation correlated to the visual presentation. In an introductory presentation mode, such presentation means are operable to present a sequence of identifications of the available products and desirable attributes and features thereof to persons in the vicinity of the machine 10. Operating instructions are also presented in the introductory presentation mode.

By way of example, the machine 10 may be used to vend products including "get well" birthday anniversary, Easter, Passover, Hanukkah, Christmas cards and other types of greeting cards. In each case, a personalized message may be printed along with the name of the recipient of the card and the name of the sender of the card.

In the illustrated embodiment, the screen 11 is operable as a touch screen for selection of the product and attributes thereof and for entering of name, date and personalized message data. The customer is invited to touch a portion of the screen to indicate an intention to consider purchase of a selected one of the available products and is then instructed audibly through voice generating means and visually through the screen 11 to effect a conditional pre-payment for the product, payment being conditioned upon the customer's final approval of the product. Pre-payment may be effected by insertion of coins in a coin slot 12, insertion of a bill in a bill receiving slot 13 or temporary insertion of a credit card in a credit card reader slot 14. Upon entry of selection and personalization data, as hereinafter described, the customer is invited to indicate final approval of a product by pressing a "buy" button 15. Change cup 16 is provided for return of coins made as prepayment and delivering any change which may be due. A refund button 17 is also provided and a small read-out display 18 may be associated with the payment receiving devices.

A delivery receptacle 19 is provided into which the selected product is delivered, along with envelope or other required associated materials. The delivery receptacle 19, the screen 11, coin slot 12, and payment-effecting devices are positioned on an inclined front panel 20 of a housing 22 which is of generally cylindrical shape as shown in FIGS. 4 and 5.

A robot 24 within the housing 22 operates to effect transfers as required to effect personalization of a product in accordance with data supplied by a customer. As shown in the side elevational and top plan views of FIGS. 2 and 3, the robot 24 includes a turret head 26 which is rotatable about a vertical axis and which is connected to a transfer head 28 through an articulated arm assembly which includes a first pair of parallel links 29 and 30 each pivotally connected at one end to the head 26 for movement about a horizonal axis 32 and a second pair of parallel links 33 and 34 having ends pivotally connected to opposite ends of links 29 and 30 for movement about an a horizontal axis 36 parallel to the axis 32. The transfer head 28 supports a pair of suction cups 37 and 38 for engaging, holding and releasing sheets, envelopes or other products to be handled by the machine and is supported by the links 33 and 34 for movement about a horizontal axis 40 parallel to the axes 32 and 36 and also for movement about an axis 42 at right angles to the axis 40. As shown somewhat diagrammatically, the transfer head is supported on a bevel gear 44 which is rotatable about axis 42 and which is meshed with a pair of bevel gears 45 and 46 rotatable about the axis 40. The angular positions of gears 45 and 46 relative to the links 33 and 34 is controlled by belts 45A and 46A engaged with pulleys 45B and 46B fixedly connected to the gears 43 and 44. If both gears 45 and 46 are rotated together in the same direction, the transfer head 28 is rotated about the axis 40; if gears 45 and 46 are rotated in opposite directions, the transfer head 28 is rotated about the axis 42.

The robot 24 is a commercially available type of robot of a type sold by Eshed Robotic, Inc. of Princeton, N.J. and includes electro-mechanical components which are not shown in detail. Such components are responsive to applied electrical signals to accurately control rotation of the turret head 26 about a vertical axis rotation of links 29 and 30 about the horizontal axis 32, rotation of the links 33 and 34 about the horizontal axis 36 and rotation of the transfer head 28 relative to the links 33 and 34 about the axes 40 and 42.

Figure 4:
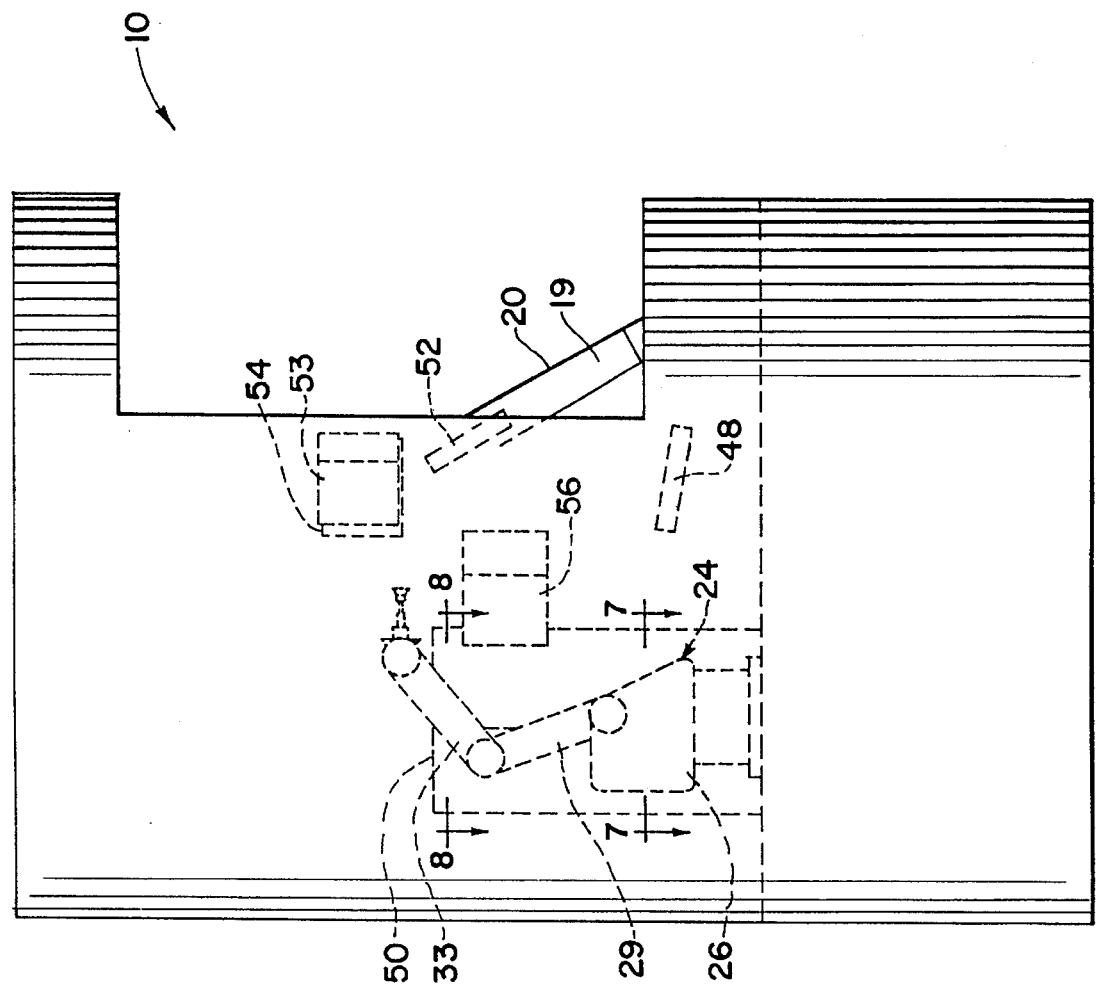
FIG. 4 is a side elevational view of the machine of FIG. 1, illustrating diagrammatically the positions of the robot of FIGS. 2 and 3 and other components within the machine.

The position of the robot 24 and the positions of other components within the housing 22 are indicated diagrammatically in dotted lines in FIGS. 4 and 5. In brief, the transfer head 28 of the robot 24 of the illustrated machine 10 is operated to pick up a sheet of greeting card stock from a blank card supply and feeder unit 48 and thereafter inserts the sheet into a feeder slot at the lower end of a printer 50, picks up the sheet after printing on one side thereof, reinserts the sheet into the printer 50 for printing on the opposite side thereof, transfers the sheet to a decurling assembly associated with the printer 50, picks up the decurled sheet from the decurling assembly, and thereafter transfers the sheet to a delivery station 52. While printing operations are taking place, the transfer head 28 is operated to transfer an envelope and a bag from envelope and bag supply stations 53 and 54 to the delivery station 52. The printed sheet, envelope and bag are then dropped downwardly from the delivery station 52 to the delivery receptacle 19 to be picked up by the customer.

One or more modifications stations are optionally provided for effecting modifications which may be desired, one such station 56 being shown diagrammatically in FIGS. 4 and 5. Such modifications include the application of foil decorations, holographic icons or other add-on pieces to the sheet, the application of braille impressions to the sheet and/or the performance of laser cut-out or other cutting operations. As shown, the modification station 56 may be located between the decurling station 49 and the delivery station 52 and it will be understood that, if desired, one or more additional modification stations may be provided, in vertically spaced relation to the illustrated station 56.

The blank card supply and feeder unit 48 is located behind the delivery receptacle 19 and as shown in perspective in the detail view of FIG. 6, it includes a pusher 57 operative to frictionally engage the top surface of an uppermost sheet 58 of a stack of sheets 59 and to move the uppermost sheet 58 upwardly and rearwardly until the upper and rearward edge thereof is against a pair of stops 61 and 62, the stack of sheets 59 being disposed in an upwardly and rearwardly inclined tray 64. Then the transfer head 28 is moved to position the suction cups 37 and 38 over the sheet 56. Suction is then applied to the suction cups 37 and 38 through flexible lines (not shown) to effect a secure holding engagement with the sheet 56 which is verified by sensing that a high negative vacuum pressure is achieved.

Figure 7:
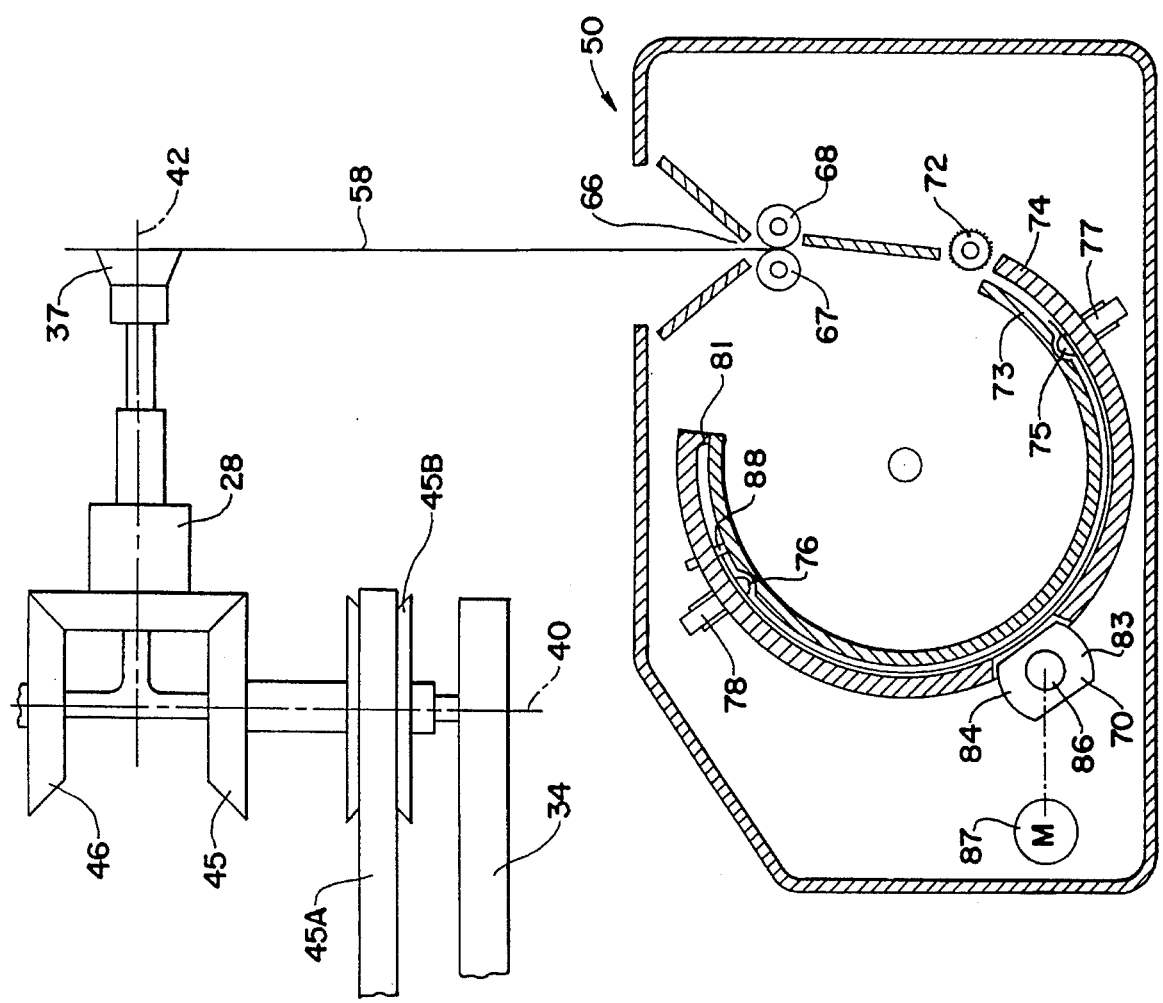
FIG. 7 is a cross-sectional view of a lower portion of a printer of the machine of FIG. 1, looking downwardly at a level as indicated by line 7—7 of FIG. 4, also showing the feed of a sheet to the printer by the robot.

FIG. 7 is a cross-sectional view of a lower portion of the printer 50, looking downwardly at a level as indicated by line 7—7 of FIG. 4, also showing the feed of sheet 58 to the printer by the robot 24. The illustrated printer 50 includes portions of a known type of ink jet color printer manufactured by Howtek, Inc. of Hudson, N.H. 70589 and disclosed in U.S. Pat. Nos. 4,591,281 and 4,714,936 the disclosures of which are incorporated by reference. In the printer 50, a rotary ink jet print head or wheel rotates at a fixed speed about a vertical axis. Paper is drawn by feed rollers into a lower end of the printer, is formed into a partial cylinder around the print wheel and is advanced upwardly, parallel to the vertical axis, while pulsing ink jetters around the periphery of the print wheel to print dot matrix characters and lines on the paper. It is possible to achieve highly attractive color printing of computer-generated graphics and text with a printer of this type. In the illustrated machine of the invention, modifications are made of the printer to obtain reliable automated operation and to print on both sides of blank greeting card stock which is relatively thick and which has a width substantially less than that of conventional paper.

In the conventional printer of the type shown, the paper is drawn from a supply in a vertically oriented cassette. In the illustrated machine, no cassette is used. Instead, the robot 24 moves the sheet 58 to a position as shown in FIG. 7 to enter a vertically extending entrance slot 66 of the printer 50 and to be picked up by feed rollers 67 and 68 of the printer 50. Another difference between the printer 50 and the conventional printer is that the printer 50 includes a "kick" roller 70 operative to allow the printer 50 to accept a sheet of substantially less than the width of standard U.S. and International papers.

Figure 8:
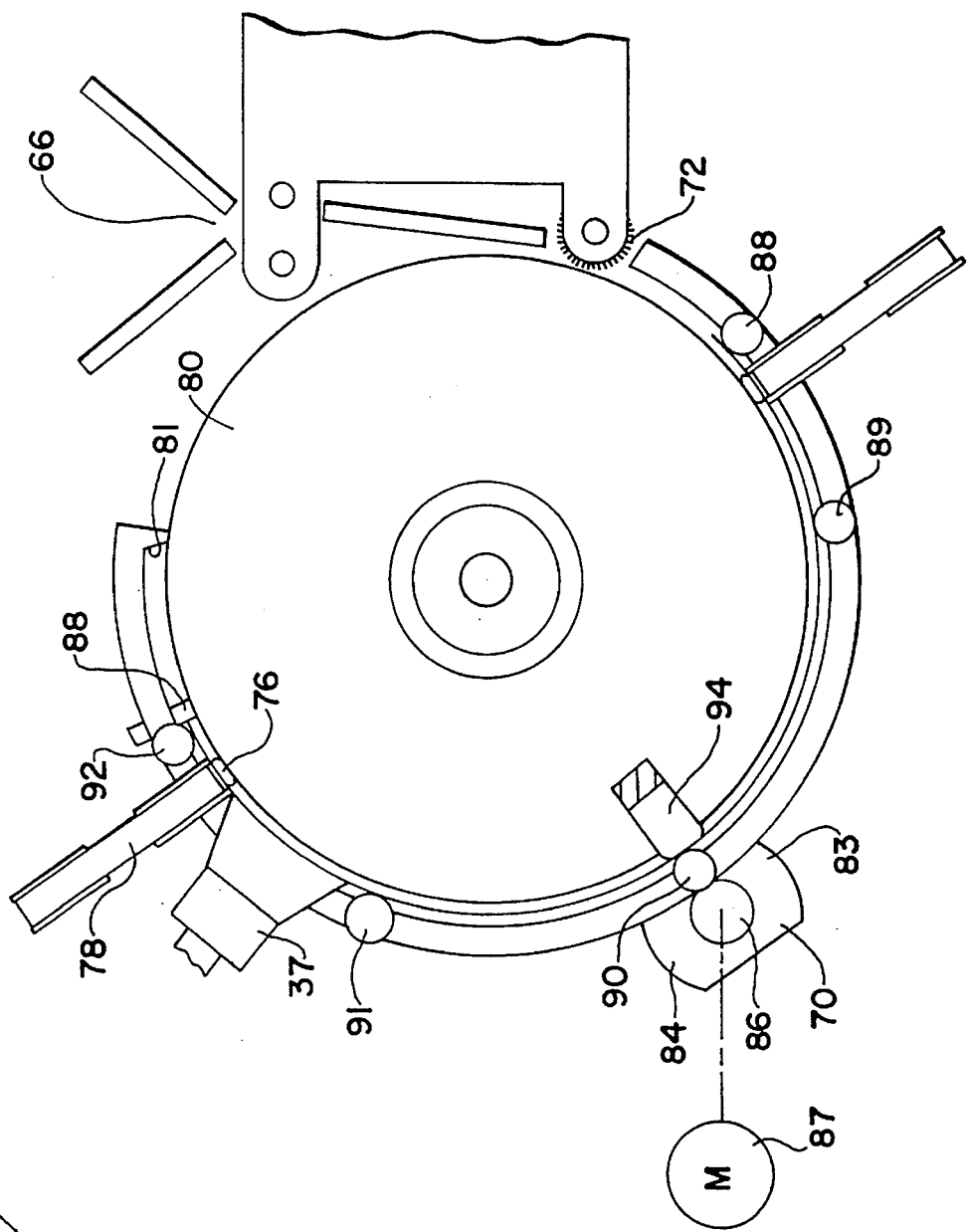
FIG. 8 is a cross-sectional view of an upper portion of the printer of the machine of FIG. 1, taken substantially along line 8—8 of FIG. 4 and showing the pick-up of a sheet from the printer by the robot.

With reference to FIG. 7, the sheet 58 is fed from the feed rollers 67 and 68 and by an advancing roller 72 into a space between inner and outer concentric guides 73 and 74 to assume the shape of a partial cylinder and to be positioned over diametrically opposed cleats 75 and 76 carried by a pair of vertically extending belts 77 and 78, to be carried upwardly past a print head 80 shown in FIG. 8. A sheet of a standard U.S. or International width (8.5 in. or 21.2 cm.) would be frictionally driven by the advancing roller 72 until being stopped by engagement of the leading edge of the sheet with a stop 81. Sheets for greeting cards have a width which is substantially less (e.g. 6¹³⁄₁₆ in.) and it is found that as a result the leading edge will not reach a position over the cleat 76 on the belt 78. The kick roller 70 is provided to solve the problem. As shown, it has two lobes 83 and 84 and is supported on a shaft 86 for rotation about a vertical axis, the shaft 86 being driven from a drive motor 87 as indicated. When the sheet has been advanced by the advancing roller 72 to position the trailing edge beyond the roller 72, the leading edge will be beyond the kick roller 70. The kick roller 70 is then rotated through 180 degrees to advance the sheet and to position the leading edge against a stop pin 88 which is provided beyond the cleat 76 of the belt 78 but short of the standard stop 81 of the printer. The trailing edge is then short of the cleat 77 of the opposite belt, so that both cleats can engage and properly raise the sheet for cooperation with the print head 80.

Further differences relate to the desirability of printing on both sides of a sheet to form a greeting card and to problems discovered to occur as a result of the thickness of greeting card stock. In the conventional printer of the type shown, the paper exiting upwardly from the printing section is formed into a generally semi-cylindrical shape and is released to "pop" out of its cylindrical shape and to a flat shape to fall into a delivery tray after printing on one side only. In the illustrated machine of the invention, a sheet of greeting card stock is moved upwardly past the print head to a position in which it is retained by five vertically extending rods 88–92 and by a holding device 94 which is supported from above and which is spring-urged toward the middle rod 90 to hold the sheet thereagainst. The sheet can then be directly picked up by the suction cups 37 and 38 of the transfer head 28, being first moved a short angular distance in a counter-clockwise direction, as viewed in FIG. 8, so that the leading edge clears the rod 88 as the sheet is withdrawn.

After printing on one side, the sheet is moved downwardly to a position opposite the entrance slot 66 and is again fed into the slot for printing on the opposite side, the position of the sheet being reversed in each printing operation. After printing on the opposite side, the sheet is again picked up by the suction cups 37 and 38 of the transfer head 28 for performance of subsequent operations.

It is found that with relatively heavy paper stock such as used in greeting cards, the sheet exiting the printing section of the printer 50 assumes a certain curl. It is also found that after printing one side, a sheet in a curled condition can be reinserted into the printer for printing on the opposite side, printing on the opposite side being effective to curl the sheet in the reverse direction. However, it is further found to be desirable to remove any curl remaining after printing on the opposite side and, in the illustrated machine, a sheet a decurling station 96 is associated with the printer 50.

Figure 9:
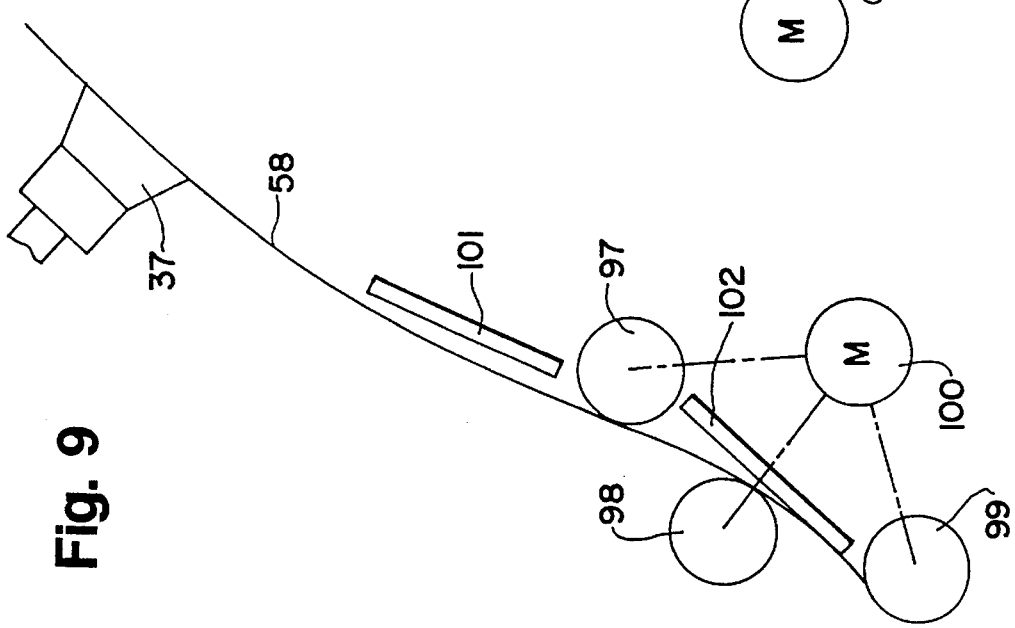
FIG. 9 diagrammatically illustrates a decurling assembly associated with the printer of the machine.
Figure 12:
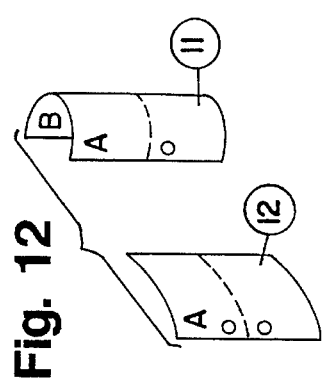
FIGS. 11 through 14 diagrammatically illustrate sequences of movements of the card subsequent to those depicted in FIG. 10.
Figure 13:
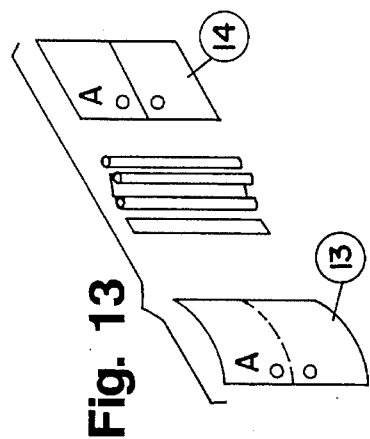

As shown diagrammatically in FIG. 9, the decurling station 96 includes three rollers 97, 98 and 99 on parallel vertical axes, driven from a drive motor 100 as indicated by broken lines. A curled sheet is moved by the transfer head 28 to cause the leading edge to be guided by a guide plate 101 between rollers 97 and 98 and to be then guided by a second guide plate 102 between rollers 98 and 99. With proper positioning of the axes of the rollers 97, 98 and 99, the sheet is then formed back into a flat condition. It is then picked up by the transfer head to be transferred either directly to the delivery station 52 or to the modification station 56 and thereafter from the modification station 56 to the delivery station 52.

The transfer and other operations as above described may be clarified by reference to FIGS. 10–14, in which the numbers 0 through 16 in circles indicate the order of positions of a sheet during progressive movement thereof, characters A and B indicate the opposite sides of the sheet and pairs of circles on the sheet indicate the positions of engagement of the suction cups 37 and 38 therewith.

In position 0, a single top sheet has been pushed by the pusher 57 to separate it from the stack of sheets 59 in the tray 64. In position 1, the sheet has been picked up by the suction cups 37 and 38, the A side being up. In position 2, the sheet has been raised several inches. In position 3, the sheet has been rotated through 90 degrees about a central fold line thereof, such rotation being effected by rotation of the transfer head 28 about the axis 42, for the purpose of placing the sheet in a vertical orientation for subsequent insertion into the printer 50.

In position 4, the sheet has been rotated about the vertical turret axis of the robot 24 and the articulated arms of the robot have been moved to position the sheet in alignment with the entrance slot 66 of the printer. In position 5, the sheet has been moved by rotation about the vertical turret axis of the robot to position the leading edge in the slot 66, for engagement by rollers 67 and 68. It is then released from the vacuum grip of the transfer head 28.

In position 6, the sheet has been fed by the printer to assume a semi-cylindrical shape, to be carried upwardly by the cleats 75 and 76 on belts 77 and 78 and to allow transfer of ink to side A by the rotating ink jet print head 80, to provide graphics and text as selected by the customer and in accordance with data stored in computer memory. In position 7, the sheet is in the upper end of the printer 50, for pick-up by the transfer head 28.

In position 8 (FIGS. 10 and 11), the sheet has been picked up by the transfer head and in position 9, it has been moved downwardly to a position opposite the entrance slot 66. The position of the sheet has now been reversed 180 degrees from movement through the printer. Position 10 of FIG. 11 corresponds to position 6 of FIG. 10 differing in that the B side is now on the inside for printing thereon. Here again, the sheet has been fed by the printer to assume a semi-cylindrical shape, to be carried upwardly by the cleats 75 and 76 on belts 77 and 78 and to allow transfer of ink to side B by the rotating ink jet print head 80, and to again provide graphics and text as selected by the customer and in accordance with data stored in computer memory.

In position 11 (FIGS. 11 and 12), the sheet is picked up by the transfer head 28 at the top of the printer 50, moved to a position 12 as shown and thence to a position 13 (FIG. 13) to enter the decurling station, being then released by the transfer head 28. At position 14, it is again picked up by the transfer head, in a decurled condition.

Figure 14:
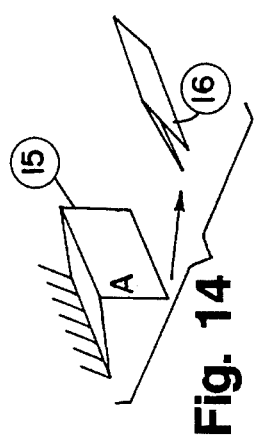
Figure 11:
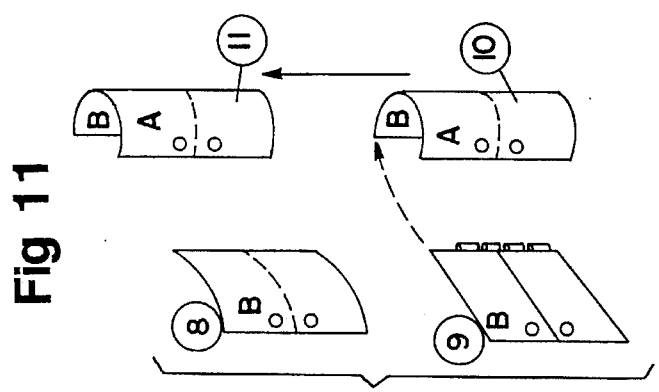
Figure 10:
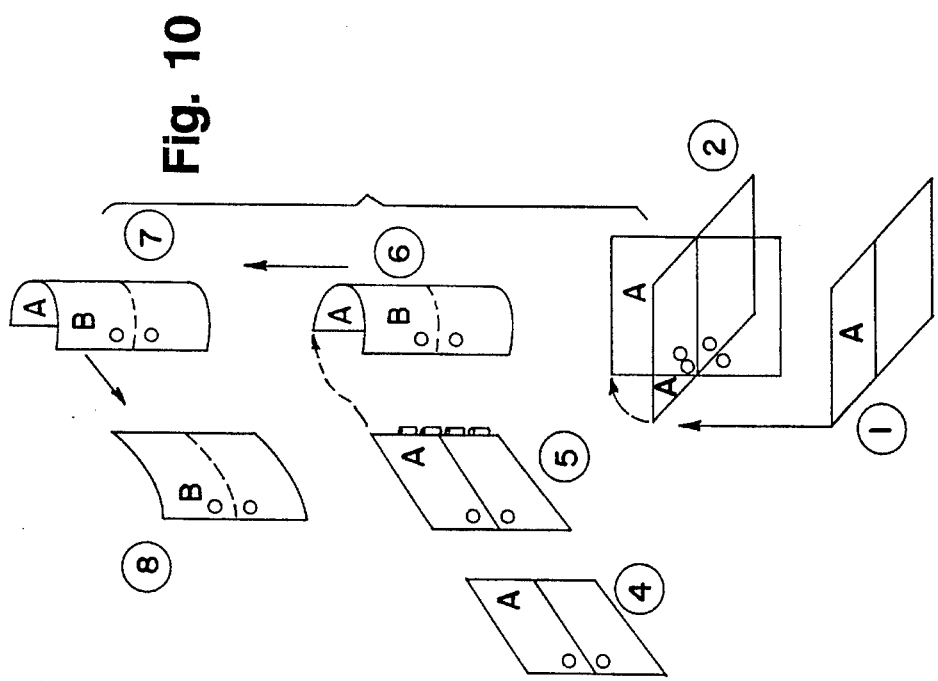
FIG. 10 diagrammatically illustrates a sequence of movements of a card from the blank card and feeder section of the machine to the printer and also movements within the printer.

FIG. 14 illustrates folding of a sheet by the robot, a pre-scored sheet being buckled against a fixed stop 104, position 15, being then pressed to a folded condition, position 16. The sheet is then moved to the delivery station 52.

Movements to and from the modification station 56 are not depicted in FIGS. 10–14, but it will be understood that movements similar to those depicted and described are used to transfer a sheet to and from the modification station 56.

Figure 15:
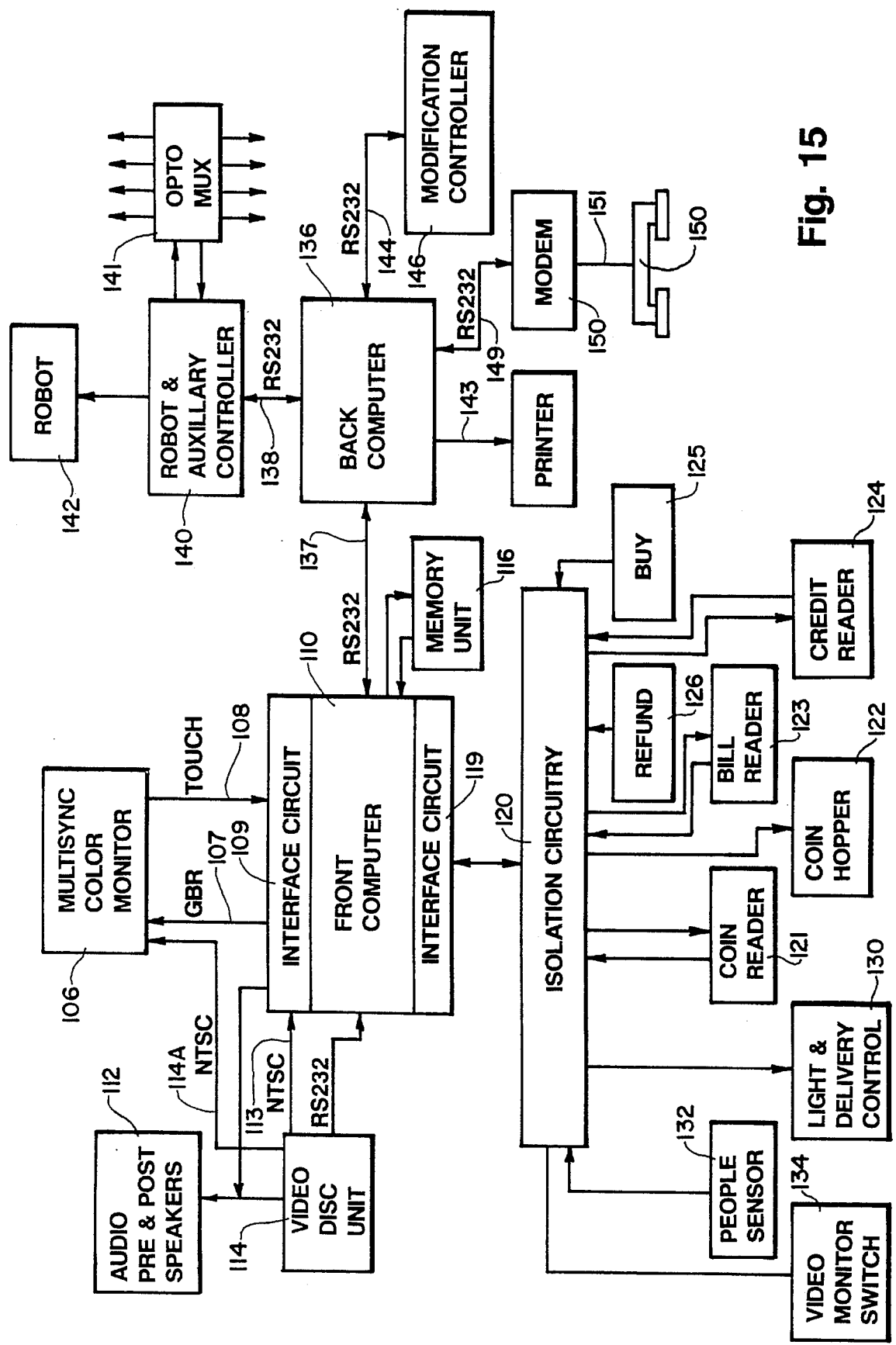
FIG. 15 is a schematic block diagram illustrating circuitry of the machine.

FIG. 15 is a schematic block diagram of the control system for visual and audio presentations and control of making of a personalized product as selected by the customer. The presentation screen 11 of FIG. 1 is provided by a monitor 106 which may be a multisync color monitor and which is connected through a video drive cable 107 and a touch signal transmission cable 108 to an interface circuit 109 of a "front" computer 110, operative to control presentation and control operations directly associated with the customer. Interface circuit 109 also operates to transmit an audio signal through a cable 111 to a speaker unit 112 and to receive a NTSC signal through a cable 113 from an optical disc unit 114. Unit 114 is also connected through a cable 114A to the monitor 106 for application of a NTSC video signal to the monitor 106 when the monitor is switched to a NTSC mode of operation, under control of a video monitor switch as hereinafter described.

The interface circuit 109 is such that the optical disc unit 114 is controllable from the front computer 110 through a RS232 serial link 115 to supply signals to develop displays of a very large number of color graphics stored on an optical disc and from which the customer may select one suitable for personalization of a card. A direct connection 115 is provided between optical disc unit 114 and the speaker unit 112 for developing an audio signal corresponding to the display developed by monitor 106 from the transmitted video signal.

For printing of color graphics corresponding to the graphics produced from the video disc, data for producing corresponding CMYB signals are stored in a memory unit 116 which may be a hard disc drive unit, for example. It will be understood that the invention is not limited to any particular form of media, either optical or magnetic or otherwise, for storing of graphics and other data.

For transmitting and receiving control signals to and from the control panel, an interface circuit 119 of the computer 110 is connected through isolation circuitry 120 to a coin reader 121 which provides the coin slot 12, to a circuit 122 which controls delivery of coins to the change cup 16, to a bill reader 123 which provides the bill receiving slot 13, to a credit card reader 124 which provides the credit card receiving slot 14, and to switch units 125 and 126 controlled by the buy and refund buttons 15 and 17. As shown, the isolation circuitry 120 is also connected to a unit 128 which controls operation of release devices of the delivery unit 52 to release a an assembly of a completed card and associated envelope and bag to fall into the delivery receptacle 19. Unit 128 also controls operation of a ring or "necklace" of lights 130 which surround the delivery receptacle 19 and which signal that the assembly may be picked up by the customer.

In addition, the isolation circuitry 120 may be connected to a people sensor 132 which senses the presence of anyone in proximity to the machine, and to video monitor switch 134 which controls the monitor 106 to operate either from RGB or other color signals applied through the cable 107 or in response to a NTSC signal applied through cable 114A from the optical disc unit 114.

To control operation of the robot 24 and the printer 50, a separate "back" computer 136 is provided in the illustrated machine 10 which is connected through a RS232 serial link 137 to the computer 110, through a RS232 serial link 138 to a controller 140 which is connected through interface and drive control circuits 141 and 142 to sense and control movements of the robot 24, supply of vacuum to the vacuum cups 37 and 38 of the transfer head 38 and control other operations including the energization of drive motor 87 for the kick roller 70 (FIG. 7), the energization of the motor 100 of the decurl assembly (FIG. 9) and the operation of the delivery unit 52. The computer 136 is also connected through a parallel bus 143 to the printer 50 and through a RS232 serial link 144 to a controller 146 for the modification station 56. In addition, the computer may optionally be connected through a RS232 serial link 149 to a modem 150 connected to a telephone line 151 for transmission of data or monitoring of machine operation at a remote location, servicing or control of the machine from a remote location. As diagrammatically shown, line 151 may optionally be connected to a handset 152 which may be used for transmitting voice signals which may be detected by voice recognition circuitry, for control purposes and/or for voice card operations performed by the modification station 56.

Figure 16:
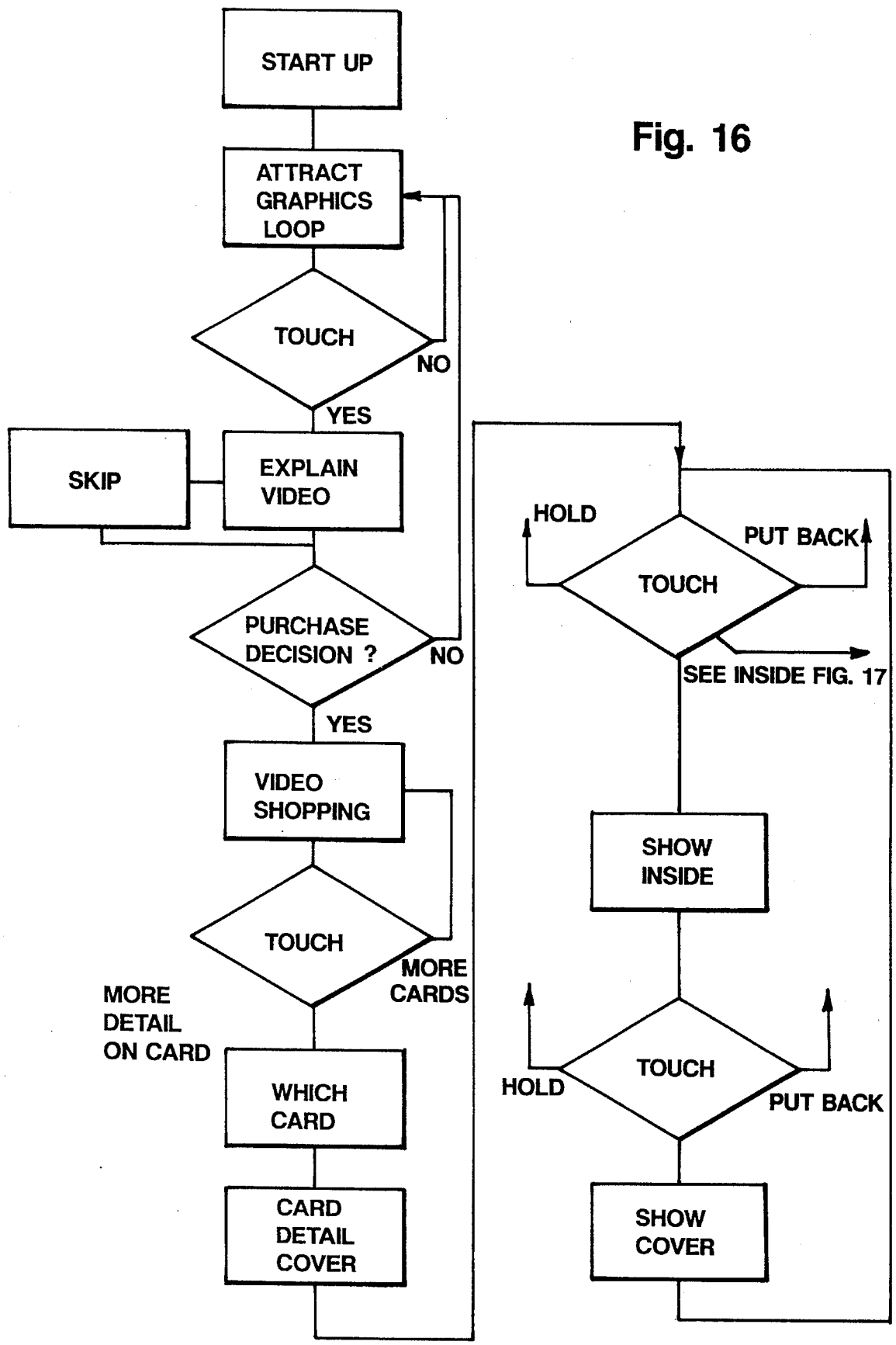
FIGS. 16 and 17 are flow diagrams illustrating the operation of a front computer of the machine.
Figure 17:
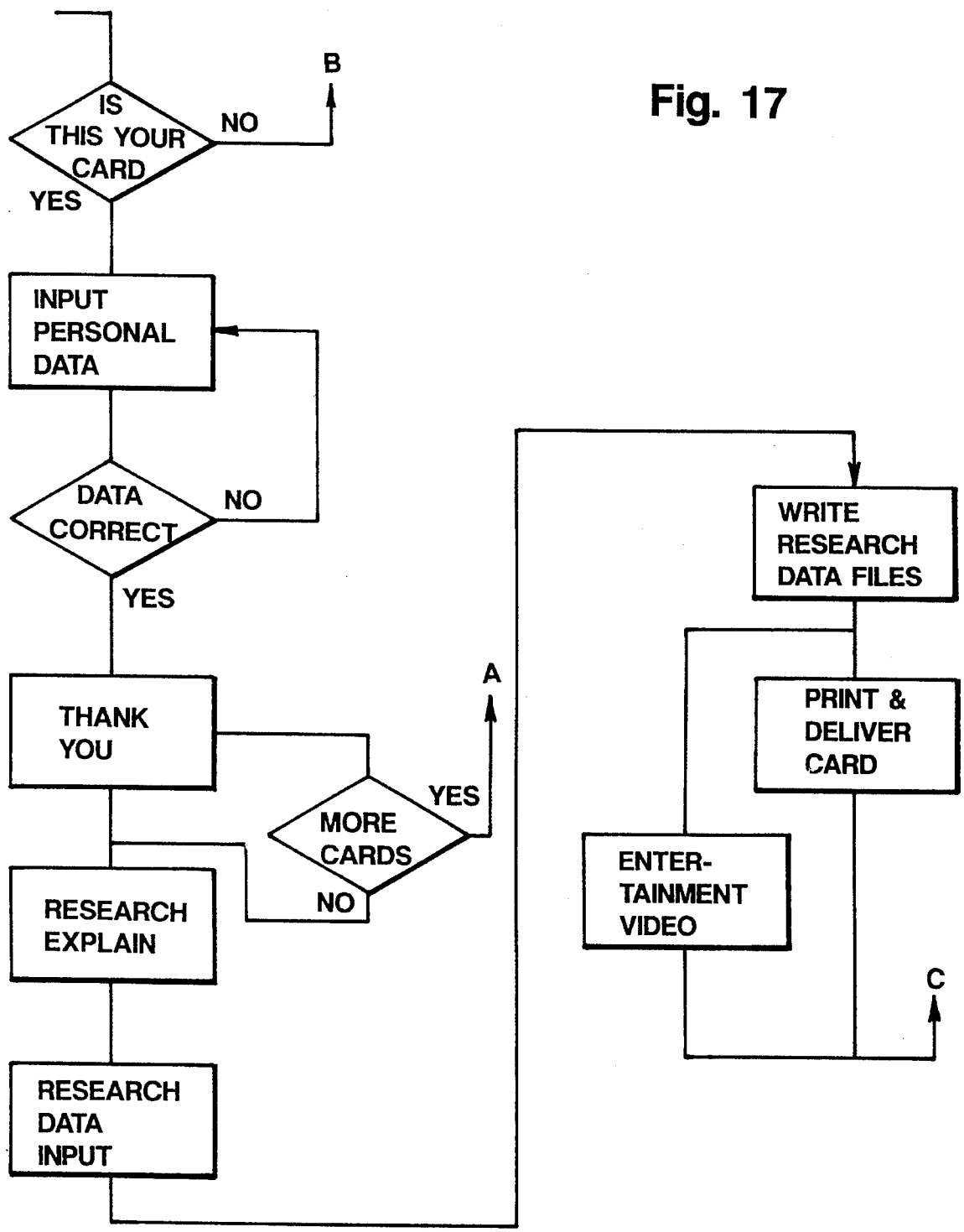

The operation of the presentation or front computer 110 is depicted in the flow charts of FIGS. 16 and 17. At start-up, graphics displays are generated to alert customers in the vicinity of the machine 10 as to products available from the machine and to instruct a customer as to how to learn about the products and the mode of operation of the machine. The displays include a message inviting the customer to touch the screen to obtain more information as to operation of the machine and more detailed information as to available products.

Upon touching the screen 11, an explanatory video is generated with associated sound, which may be skipped by touching a certain area of the screen if, for example, the customer is already knowledgeable about the operation. The customer is invited to make a revocable decision to consider purchase of a product, by touching a certain area of the screen 11. If he or she does not do so after a certain time interval the operation reverts to the start condition. If the customer decides to consider a purchase, a video shopping program is initiated in which for example, the customer is invited to select from a number of categories. If the customer selects the birthday card category, he or she may then be invited to select between categories including humorous and romantic, and the age and sex of the recipient and relationship of the recipient to the customer. More and more cards may presented until the customer finds one which appears to be suitable. Then more detail is provided, including full screen high resolution images of the cover and inside of the card. The tentatively selected card may be held or further consideration or may be "put back" to be dismissed from further consideration, whereupon more cards may be considered. Once the customer finds a card to his or her liking, the buy button 15 is pressed and an operation is then initiated for selection of personalized data. This operation is similar to that disclosed in the aforementioned Banks et al. application U.S. Ser. No. 514,670, filed Apr. 25, 1990, the disclosure of which is incorporated by reference.

After the customer indicates final approval of a card, operation is initiated to print the card, data stored in the RAM of the front computer 110 and in the memory unit 116 being transferred to the background computer 136 through the serial link 137. The aforedescribed printing and associated assembly operations are then initiated under control by the background computer 136. At this time, the customer is informed through video and audio presentations as to the expected time before the card will be completed and is invited to participate in supplying survey data as his or her sex, age, etc., similar data as to the recipient of the card, and any comments which the customer may wish to convey. Then, if time remains, an entertainment video is presented until the card has been completed and delivered.

Figure 20:
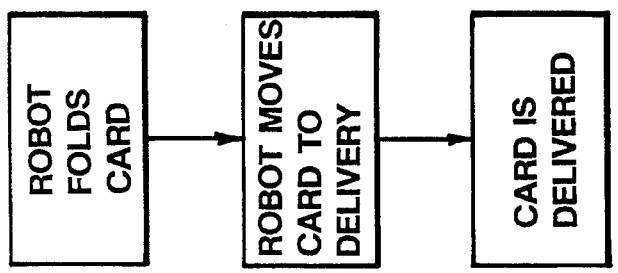
Figure 19:
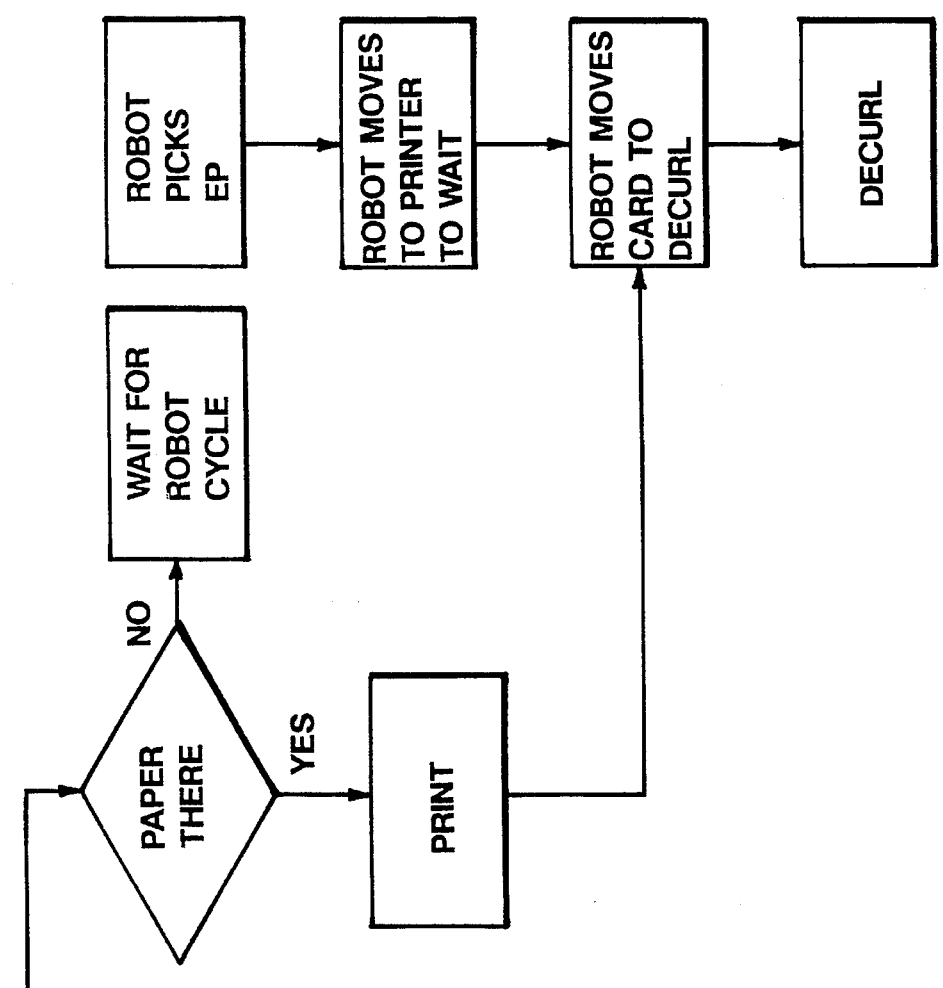

Operations of the background computer 136 are illustrated in the flow diagrams of FIGS. 18, 19 and 20 and in a timing diagram of FIG. 21, which are generally self-explanatory. Important features relate to the interleaving of operations in a manner such as to minimize the time required for completion of a card. For example, a down load of data to the computer 136, initiated immediately after a buy decision is made, is performed at least in part while paper is being initially delivered to the printer. After feeding paper to the printer for printing of one side and while waiting for completion of that operation, the robot handles the delivery of a bag to the delivery station and then goes to a "top wait" condition. Then when printing of the first side is completed, a second down load of data is immediately initiated and the robot then reinserts the paper in the printer, for printing of the second side. The robot then handles the delivery of an envelope to the delivery station while waiting for completion of printing of the second side.

FIG. 22 illustrates another and more versatile form of machine 154 constructed in accordance with the principles of the invention and operative not only for delivery of personalized products in the form of greeting cards but also for delivery of other forms of personalized products, including audio and video tape cassettes, floppy or transportable discs, still videos and smart cards. The machine 154 includes a screen 156 which is operative in a manner similar to the screen 11 of machine 10, for entry of data for selection of the type of personalized product to be delivered and the desired form of personalization thereof.

The machine 154 may also accept various other forms of analog or digital input data supplied by the customer including data on a tape cassette inserted by a customer in a slot 157, data on a CD Rom inserted by a customer in a slot 158, data on a 3½ inch floppy disc inserted by a customer in a slot 159, data on 5¼ inch floppy disc inserted by a customer in a slot 160, data on 8 mm. cassette inserted by a customer in a slot 161, data on a still video disc inserted by a customer in a slot 162 and data on a VHS video cassette inserted in a slot 163.

In addition, the machine 154 may accept input from a scanner 164, a keyboard 165, a microphone 166, an optical character reader 167 and a video camera 168. The microphone 166 may be used for developing audio signals to be recorded in a product to be produced and/or in conjunction with voice recognition circuitry. Also a light pen 170 may be used in connection with the screen 156 for entry of data and a telephone handset 172 is provided for communication with a control station at a remote location. A panel 173 is provided for effecting cash or credit payment using components like those of the control panel of the machine 10 and a hard goods delivery receptacle 174 is provided like the delivery receptacle 19 of the machine 10.

Figure 23:
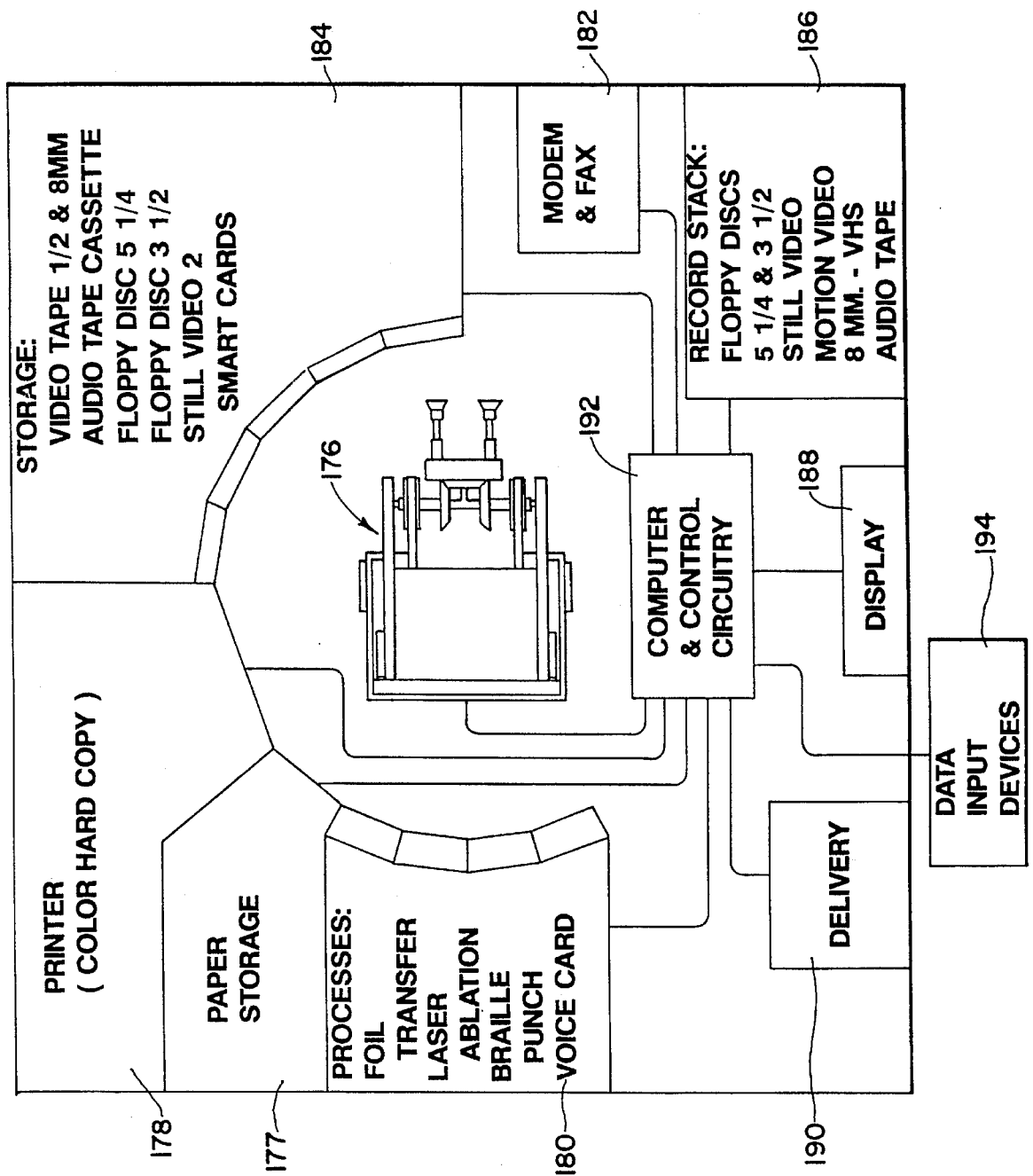
FIG. 23 is a schematic diagram of internal hardware of the machine of FIG. 22.

FIG. 23 diagrammatically illustrates the internal hardware of the machine 154 which includes a robot 176 arranged for cooperation with paper storage 177 corresponding to the blank card and feeder unit 48 of the machine 10, a printer 178 corresponding to the printer 50 of the machine 10 and a modification station 180 corresponding to the modification station 56 of the machine 10.

The modification station 180 is arranged to perform various processes. For example, as shown, it may include apparatus for transfer of foil to a card, for laser ablation or other cutting operations, braille punch apparatus and voice card apparatus. The voice card apparatus operates to supply circuitry for reproducing the customer's voice, or for reproducing any audio signal which may be supplied by the customer. The voice card may be added to a greeting card or may be supplied as a separate item, if desired.

The hardware shown in FIG. 23 also includes a modem/fax unit 182, and a storage unit 184 for storage of the various forms of products to be delivered and for effecting recording thereon in accordance with personalization instructions and data supplied by the customer. In addition, the hardware includes a record stack section 186 including various items as indicated, a display unit 188 for effecting operation of the display and touch screen 156 and a delivery unit 190 for receiving items from the robot 176 and delivery thereof to the hard goods receptacle 174. Computer and control circuitry 192 similar to that depicted in FIG. 15 is provided for operation of the various components of the machine 154, circuitry 192 being connected to various data input devices which are indicated by block 194 and which are shown in FIG. 22.

It will be understood that the operation of the robot 24 and other components of the machine 10 as described in detail hereinbefore may be extended to effect operation of the various input receiving components and to effect operation of the robot 176 and other components of the machine 154 for effecting personalization of various hard goods and delivery thereof to the delivery receptacle 174.

It will be understood that modifications and variations may be effected without departing from the spirit and scope of the novel concepts of this invention

What is claimed is:

1. A machine for delivering a greeting card which may be automatically personalized by the customer at the time of purchase, said machine comprising: storage means for storing greeting card stock, delivery receptacle means, product handling means for effecting a series of operations and including electrically controllable transfer means for effecting transfer of greeting card stock from said storage means, electrically controllable printing means for printing graphics and text on greeting card stock transferred by said transfer means and for effecting printing of both high quality graphics and text on said transferred stock for production of a personalized greeting card, and electrically controllable delivery means for effecting delivery of said personalized greeting card from said printing means to said delivery receptacle means, an enclosure containing said storage, receptacle and printing means therewithin, payment means operable by a customer on the outside of said enclosure to effect payment for a greeting card, selection means operable by a customer on the outside of said enclosure to effect entry of control data to select graphics and text to be provided on the personalized greeting card to be delivered to the customer, and computer means within said enclosure and coupled to said payment and selection means and to said electrically controllable transfer, printing and delivery means of said product handling means, said computer means controlling said transfer, printing and delivery means of said product handling means following payment by a customer to perform a series of operations in accordance with said control data, said series of operations being performed within said enclosure without operator intervention and including transfer of greeting card stock from said storage means, printing of a sheet of greeting card stock transferred from said storage means and delivery of the desired final form of personalized greeting card from said printing means to said delivery receptacle means.

2. A machine as defined in claim 1, said selection means including display means for displaying a plurality of greeting card designs for selection by the customer.

3. A machine as defined in claim 2, said computer means being operable for controlling operation of said display means as well as said product handling means.

4. A machine as defined in claim 3, including memory means associated with said computer means for storage of data for selective display of said plurality of greeting card designs by said display means and for printing of any selected one of said plurality of greeting card designs by said printing means.

5. A machine as defined in claim 4, said computer means being arranged for downloading data from said memory means for printing of a greeting card design while concurrently controlling said transfer means to transfer greeting card stock to said printing means.

6. A machine as defined in claim 4, said computer means being arranged for operating said display means for entry by a customer of data for personalization of a greeting card as well as for selection of a card design to be personalized.

7. A machine as defined in claim 1, said transfer means being arranged for transferring one sheet of greeting card stock at a time from said storage means to said printing means.

8. A machine as defined in claim 7, said transfer means including transfer head means which includes pick-up means for pick-up of one sheet of greeting card stock from said storage means, and actuating means for moving said transfer head means to move said sheet to said printing means.

9. A machine as defined in claim 8, said printing means including an entrance for receiving said sheet and being arranged for printing on one side of said sheet while moving said sheet from said entrance to an exit region, and said transfer means being arranged to move said sheet from said exit region to said entrance after one printing operation to print on the opposite side of said sheet in a second printing operation.

10. A machine as defined in claim 8, said printing means including ink jet head means rotatable about a vertical axis, and sheet handling means for receiving a sheet at an entrance below said head means, forming the sheet into a partial cylinder and moving the formed sheet upwardly past said head means to an upper exit region while operating said head means to print on a radially inwardly facing side of the sheet.

11. A machine as defined in claim 10, said sheet handling means including a pair of vertically extending belts on diametrically opposite sides of said vertical axis and having cleats thereon in vertical alignment, sheet guide means defining a guide path extending arcuately about said axis on the inside of and past both of said belts, and stop means limiting movement of the sheet to a limit position in which it forms a partial cylinder extending over both of said cleats to be carried upwardly by said cleats past said print head for transfer of ink thereto.

12. A machine as defined in claim 11, said sheet handling means including roller means adjacent an intermediate portion of said guide path and engageable with a sheet to move the sheet toward said limit position.

13. A machine as defined in claim 10, said transfer means being arranged to move said sheet from said exit region to said entrance after one printing operation to print on the opposite side of said sheet in a second printing operation.

14. A machine as defined in claim 10, said sheet handling means including guide means extending vertically above said print head and operative to releasably hold a sheet in the form of a partial cylinder for pick up by said pickup means.

15. A machine as defined in claim 1, wherein a greeting card has a curl after completion of printing of graphics and text thereof by said printing means, said machine including decurling means associated with said printing means for removal of said curl.

16. A machine as defined in claim 15, said decurling means including first, second and third roller means on spaced axes, means for rotating said roller means, and means for guiding a leading edge of a greeting card to pass between said first and second roller means and then between said second and third roller means, the axis of said second roller means being offset from a plane through the axes of said first and third roller means to an extent such as to remove curl from the greeting card.

17. A machine as defined in claim 15, said printing means including an entrance for receiving a sheet of printing card stock and being arranged for printing on said sheet while moving said sheet from said entrance to an exit region, said transfer means including transfer head means which includes pick-up means for pick-up of one sheet of greeting card stock from said storage means, and means for moving said transfer head means to move said sheet to said entrance of said printing means, thereafter moving said sheet from said exit region of said printing means and to said decurling means, and thereafter moving said sheet from said decurling means to said delivery means.

18. A machine as defined in claim 1, modification means for effecting modifications of a greeting card sheet, said transfer means being operative to move a sheet to and from said modification means for effecting of said modifications after transfer from said storage means and before movement to said delivery means.

19. A machine as defined in claim 1, said printing means being arranged to deliver a sheet of greeting card stock to an exit region thereof after printing of graphics and text thereon, said transfer means including transfer head means which includes suction pick-up means for picking up a sheet at said exit region of said printing means and subsequently moving said sheet to said delivery means.

20. A machine as defined in claim 1, envelope storage means for storage of envelopes, said product handling means including means for moving an envelope from said envelope storage means to said delivery means, and said delivery means being operable to deliver both a personalized greeting card and an envelope to said delivery receptacle means.

21. A machine as defined in claim 20, bag storage means for storing bags, said product handling means including means for moving a bag from said bag storage means to said delivery means, and said delivery means being operable to deliver a personalized greeting card together with an envelope and a bag to said delivery receptacle means.

22. A machine as defined in claim 1, said printing means including an entrance for receiving one sheet of greeting card stock and being arranged to deliver a sheet of greeting card stock to an exit region thereof after printing of graphics and text thereon, said transfer means including transfer head means which includes suction pick-up means for picking up a sheet from said storage means, then transferring said sheet to said entrance of said printing means, thereafter picking up a sheet at said exit region of said printing means and thereafter moving said sheet to said delivery means.

23. A machine as defined in claim 22, said transfer means including an articulated arm assembly arranged for effecting vertical components of movement of said pick-up means and operable to move a sheet to a position above said delivery means to be dropped into said delivery means.

24. A machine as defined in claim 1, said printer being arranged for printing color graphics and text on said greeting card stock.

25. A machine for delivering a product which may be automatically personalized by the customer at the time of purchase and which is selected from a plurality of different types of products including products of forms which communicate in a plurality of media, said machine comprising: storage means for storing base products of a plurality of forms adapted to be modified to communicate in said plurality of media, delivery receptacle means, product handling means for effecting a series of operations and including electrically controllable transfer means for effecting transfer of a base product from said storage means, electrically controllable modification means for effecting modification of said base product to produce a modified base product and electrically controllable delivery means for effecting delivery of said modified base product to said delivery receptacle means, an enclosure containing said storage, receptacle and product handling means therewithin, payment means operable by a customer on the outside of said enclosure to effect payment for a product, selection means operable by a customer on the outside of said enclosure to effect entry of control data which defines the customer's selection of the media form of the base product and modifications to be performed of the selected media form to thereby define the desired final form of the personalized product to be delivered to the customer, and computer means within said enclosure and coupled to said payment and selection means and to said electrically controllable transfer, modification and delivery means of said product handling means, said computer means controlling said transfer, modification and delivery means of said product handling means following payment by a customer to perform a series of operations in accordance with said control data, said series of operations being performed within said enclosure without operator intervention and including transfer of a base product of the selected media form from said storage means, modification of a base product transferred from said storage means in accordance with the customer's selection and delivery of the desired final form of product from said modification means to said delivery receptacle means.

26. A machine as defined in claim 25, said plurality of forms of media including video tape cassettes.

27. A machine as defined in claim 25, said plurality of forms of media including audio tape cassettes.

28. A machine as defined in claim 25, said plurality of forms of media including floppy discs.

29. A machine as defined in claim 25, said plurality of forms of media including still video discs.

30. A machine as defined in claim 25, said plurality of forms of media including smart cards.

31. A machine as defined in claim 25, input means for input of each of a plurality of forms of input media, and input media selection means for selection by the customer from among said plurality of forms of input media.

32. A machine as defined in claim 31, said forms of input media including video cassettes.

33. A machine as defined in claim 31, said forms of input media including audio cassettes.

34. A machine as defined in claim 31, said forms of input media including floppy discs.

35. A machine as defined in claim 31, said forms of input media including still video discs.

36. A machine as defined in claim 31, said forms of input media including live video.

37. A machine as defined in claim 31, said forms of input media including documents which may be scanned, said input means including a scanner.

38. A machine as defined in claim 30, including a keyboard for entry of control and personalization data.

39. A machine as defined in claim 31, including an optical character reader.

40. A machine as defined in claim 31, including voice recognition means for entry of control data.

41. A machine for delivering a greeting card which may be automatically personalized by the customer at the time of purchase, said machine comprising: storage means for storing greeting card stock, delivery receptacle means, product handling means for effecting a series of operations and including electrically controllable transfer means for effecting transfer of greeting card stock from said storage means, electrically controllable printing means for printing graphics and text on greeting card stock transferred by said transfer means and for effecting printing of both high quality graphics and text on said transferred stock for production of a personalized greeting card, electrically controllable modification means for modification of greeting card stock after transfer from said storage means and before transfer as a printed card to said delivery means, and electrically controllable delivery means for effecting delivery of said modified and personalized greeting card from said printing means to said delivery receptacle means, an enclosure containing said storage, receptacle and printing means therewithin, payment means operable by a customer on the outside of said enclosure to effect payment for a greeting card, selection means operable by a customer on the outside of said enclosure to effect entry of control data to select modifications of and graphics and text to be printed on the personalized greeting card to be delivered to the customer, and computer means within said enclosure and coupled to said payment and selection means and to said electrically controllable transfer, printing and delivery means of said product handling means, said computer means controlling said transfer, printing, modification and delivery means of said product handling means following payment by a customer to perform a series of operations in accordance with said control data.

42. A machine as defined in claim 41, said modification means including transfer means for transfer of a decorative object to a sheet of greeting card stock.

43. A machine as defined in claim 41, said modification means including card ablation means.

44. A machine as defined in claim 41, said modification means including braille punch means.

45. A method of automated supply of products created according to preferences of a customer to be thereby of personalized form, said method comprising the steps of storing base products of a plurality of forms adapted to be modified in accordance with said preferences of a customer, communicating data to the customer defining forms of products and product modifications which are available for selection and authorizations required from the customer for producing modified products, detecting a customer's selection of a form of product and modifications thereof and the customer's authorization of production thereof, automatically responding to said selection and authorization by effecting a series of operations including automatically effecting transfer from storage of a base product of the form selected by the customer, automatically effecting modification of the transferred base product of the selected form to produce a base product modified in accordance with the customer's selection, and automatically effecting delivery of the modified base product to the customer wherein said available forms of products are such as to communicate in a plurality of media and wherein a customer's selection of a form of product includes a selection of a particular medium of communication.

* * * * *